US011856483B2

(12) United States Patent
Kratz et al.

(10) Patent No.: US 11,856,483 B2
(45) Date of Patent: *Dec. 26, 2023

(54) METHOD AND SYSTEM FOR RADIOLOCATION ASSET TRACKING VIA A MESH NETWORK

(71) Applicant: ZaiNar, Inc., Redwood City, CA (US)

(72) Inventors: Philip A. Kratz, Redwood City, CA (US); Daniel Jacker, Redwood City, CA (US)

(73) Assignee: ZaiNar, Inc., Redwood City, CA (US)

(*) Notice: Subject to any disclaimer, the term of this patent is extended or adjusted under 35 U.S.C. 154(b) by 388 days.

This patent is subject to a terminal disclaimer.

(21) Appl. No.: 17/152,719

(22) Filed: Jan. 19, 2021

(65) Prior Publication Data

US 2021/0321218 A1   Oct. 14, 2021

Related U.S. Application Data

(63) Continuation of application No. 16/864,024, filed on Apr. 30, 2020, now Pat. No. 10,932,094, which is a
(Continued)

(51) Int. Cl.
*H04W 4/029* (2018.01)
*H04L 27/22* (2006.01)
(Continued)

(52) U.S. Cl.
CPC ............ *H04W 4/029* (2018.02); *H04L 27/22* (2013.01); *H04L 67/53* (2022.05); *H04W 4/02* (2013.01);
(Continued)

(58) Field of Classification Search
CPC ..... H04W 4/029; H04W 4/02; H04W 56/002; H04W 64/00; H04W 4/33; H04W 84/12; H04W 84/18; H04L 67/53; H04L 27/22
See application file for complete search history.

(56) References Cited

U.S. PATENT DOCUMENTS 4,897,630 A   1/1990   Nykerk
5,734,833 A   3/1998   Chiu et al.
(Continued)

FOREIGN PATENT DOCUMENTS

CN   101632322 A   1/2010
CN   103852754 A   6/2014
(Continued)

OTHER PUBLICATIONS

Non-Final Office Action, U.S. Appl. No. 16/595,134, dated Dec. 8, 2020, 14 pages, USPTO.
(Continued)

*Primary Examiner* — Umair Ahsan
(74) *Attorney, Agent, or Firm* — Run8 Patent Group, LLC; Peter Miller

(57) ABSTRACT

A method of determining a reference clock in a mesh network includes receiving multiple signals, correlating the multiple signals with a local signal generated by the first node to determine a coarse set of time differences, refining the coarse set of time differences using a phase of a carrier signal of the multiple signals to produce a refined set of time differences, and using the refined set of time differences to define a reference clock.

20 Claims, 9 Drawing Sheets

Related U.S. Application Data continuation of application No. 16/559,495, filed on Sep. 3, 2019, now Pat. No. 10,681,500, which is a continuation of application No. 15/644,717, filed on Jul. 7, 2017, now Pat. No. 10,455,350.

(60) Provisional application No. 62/360,446, filed on Jul. 10, 2016.

(51) Int. Cl.
  *H04W 56/00* (2009.01)
  *H04W 4/02* (2018.01)
  *H04W 64/00* (2009.01)
  *H04L 67/53* (2022.01)
  *H04W 84/18* (2009.01)
  *H04W 84/12* (2009.01)
  *H04W 4/33* (2018.01)

(52) U.S. Cl.
  CPC ......... *H04W 56/002* (2013.01); *H04W 64/00* (2013.01); *H04W 4/33* (2018.02); *H04W 84/12* (2013.01); *H04W 84/18* (2013.01)

(56) References Cited

U.S. PATENT DOCUMENTS

| | | | |
|---|---|---|---|
| 5,746,697 A | 5/1998 | Swedlow et al. | |
| 6,694,142 B1 | 2/2004 | Kuwahara et al. | |
| 7,020,501 B1 | 3/2006 | Elliott et al. | |
| 7,057,556 B2 | 6/2006 | Hall et al. | |
| 7,177,656 B2 * | 2/2007 | Pinault | H04W 56/001 455/512 |
| 7,239,277 B2 | 7/2007 | Fullerton et al. | |
| 7,332,890 B2 | 2/2008 | Cohen et al. | |
| 7,388,541 B1 | 6/2008 | Yang | |
| 7,515,555 B2 | 4/2009 | Ishidoshiro | |
| 7,515,556 B2 | 4/2009 | Hui et al. | |
| 7,548,576 B2 | 6/2009 | Dowla et al. | |
| 7,574,221 B2 | 8/2009 | Guvenc et al. | |
| 7,764,231 B1 | 7/2010 | Karr et al. | |
| 7,962,150 B2 | 6/2011 | Hertzog et al. | |
| 7,969,928 B2 | 6/2011 | Chiricescu et al. | |
| 7,979,096 B1 | 7/2011 | Elliott et al. | |
| 8,009,602 B2 | 8/2011 | Hui et al. | |
| 8,102,784 B1 | 1/2012 | Lemkin et al. | |
| 8,121,080 B2 | 2/2012 | Ham et al. | |
| 8,289,159 B2 | 10/2012 | Julian et al. | |
| 8,325,704 B1 | 12/2012 | Lemkin et al. | |
| 8,401,560 B2 | 3/2013 | Potkonjak | |
| 8,478,292 B2 | 7/2013 | Kim et al. | |
| 8,553,664 B2 | 10/2013 | Bansal et al. | |
| 8,575,929 B1 | 11/2013 | Wiegert | |
| 8,886,229 B2 | 11/2014 | Nanda et al. | |
| 8,923,773 B1 | 12/2014 | Gitlin et al. | |
| 9,113,343 B2 | 8/2015 | Moshfeghi | |
| 9,222,785 B2 | 12/2015 | Banin et al. | |
| 9,261,580 B2 | 2/2016 | Banin et al. | |
| 9,304,186 B2 | 4/2016 | Amizur et al. | |
| 9,404,997 B2 | 8/2016 | Amizur et al. | |
| 9,529,076 B2 | 12/2016 | Subramanian et al. | |
| 9,596,042 B2 | 3/2017 | Siomina et al. | |
| 9,706,489 B2 | 7/2017 | Subramanian et al. | |
| 9,763,054 B2 | 9/2017 | Kong et al. | |
| 9,801,137 B2 | 10/2017 | Ree et al. | |
| 9,811,800 B1 | 11/2017 | Patel | |
| 9,980,097 B2 | 5/2018 | Narasimha et al. | |
| 10,028,220 B2 | 7/2018 | Subramanian et al. | |
| 10,075,334 B1 | 9/2018 | Kozura et al. | |
| 10,142,793 B2 | 11/2018 | Pandharipande et al. | |
| 10,156,852 B2 | 12/2018 | Bakhishev et al. | |
| 10,231,233 B2 | 3/2019 | Matsuo et al. | |
| 10,250,955 B2 | 4/2019 | Schwartz et al. | |
| 10,270,642 B2 | 4/2019 | Zhang et al. | |
| 10,397,872 B2 | 8/2019 | Choi et al. | |
| 10,455,350 B2 * | 10/2019 | Kratz | H04W 56/002 |
| 10,455,368 B2 | 10/2019 | Ylamurto | |
| 10,462,625 B2 | 10/2019 | Pandharipande et al. | |
| 10,504,364 B2 | 12/2019 | Bakhishev et al. | |
| 10,514,704 B2 | 12/2019 | Bakhishev et al. | |
| 10,536,901 B2 | 1/2020 | Ylamurto et al. | |
| 10,551,479 B1 | 2/2020 | Ylamurto et al. | |
| 10,638,476 B2 | 4/2020 | Matsuo et al. | |
| 10,678,865 B1 | 6/2020 | Resheff et al. | |
| 10,681,500 B2 * | 6/2020 | Kratz | H04W 64/00 |
| 10,798,529 B1 | 10/2020 | Beg et al. | |
| 10,932,094 B2 * | 2/2021 | Kratz | H04W 56/002 |
| 2002/0118723 A1 | 8/2002 | Mccrady et al. | |
| 2003/0037033 A1 | 2/2003 | Nyman et al. | |
| 2003/0063585 A1 | 4/2003 | Younis et al. | |
| 2003/0169697 A1 | 9/2003 | Suzuki et al. | |
| 2004/0004905 A1 | 1/2004 | Lyon et al. | |
| 2005/0020279 A1 | 1/2005 | Markhovsky et al. | |
| 2005/0049821 A1 | 3/2005 | Sahinoglu | |
| 2005/0080924 A1 | 4/2005 | Shang et al. | |
| 2005/0141465 A1 | 6/2005 | Kato et al. | |
| 2005/0195109 A1 | 9/2005 | Davi et al. | |
| 2005/0228613 A1 | 10/2005 | Fullerton et al. | |
| 2005/0271057 A1 | 12/2005 | Kim et al. | |
| 2006/0072487 A1 | 4/2006 | Howard | |
| 2006/0104387 A1 | 5/2006 | Sahinoglu et al. | |
| 2006/0187034 A1 | 8/2006 | Styers et al. | |
| 2006/0198346 A1 | 9/2006 | Liu et al. | |
| 2006/0212570 A1 | 9/2006 | Aritsuka et al. | |
| 2006/0227729 A1 | 10/2006 | Budampati et al. | |
| 2006/0248197 A1 | 11/2006 | Evans et al. | |
| 2006/0285524 A1 | 12/2006 | Schotten et al. | |
| 2007/0002797 A1 | 1/2007 | Lai | |
| 2007/0005292 A1 | 1/2007 | Jin et al. | |
| 2007/0042706 A1 | 2/2007 | Ledeczi et al. | |
| 2007/0111735 A1 | 5/2007 | Srinivasan et al. | |
| 2007/0115827 A1 | 5/2007 | Boehnke et al. | |
| 2007/0133469 A1 | 6/2007 | Shin et al. | |
| 2007/0150565 A1 | 6/2007 | Ayyagari et al. | |
| 2007/0200759 A1 | 8/2007 | Heidari-Bateni et al. | |
| 2007/0217379 A1 | 9/2007 | Fujiwara et al. | |
| 2007/0250212 A1 | 10/2007 | Halloran et al. | |
| 2008/0014626 A1 | 1/2008 | Pohlscheidt et al. | |
| 2008/0014963 A1 | 1/2008 | Takizawa et al. | |
| 2008/0032708 A1 | 2/2008 | Guvenc et al. | |
| 2008/0039119 A1 | 2/2008 | Crawford et al. | |
| 2008/0049700 A1 | 2/2008 | Shah et al. | |
| 2008/0069008 A1 | 3/2008 | Park et al. | |
| 2008/0090588 A1 | 4/2008 | Mizugaki et al. | |
| 2008/0100505 A1 | 5/2008 | Malinovskiy et al. | |
| 2008/0146262 A1 | 6/2008 | Schwoerer et al. | |
| 2008/0164979 A1 | 7/2008 | Otto | |
| 2008/0164997 A1 | 7/2008 | Aritsuka et al. | |
| 2008/0212557 A1 | 9/2008 | Chiricescu et al. | |
| 2008/0231449 A1 | 9/2008 | Moshfeghi | |
| 2008/0253327 A1 | 10/2008 | Kohvakka et al. | |
| 2008/0293360 A1 | 11/2008 | Maslennikov et al. | |
| 2008/0298796 A1 | 12/2008 | Kuberka et al. | |
| 2008/0309481 A1 | 12/2008 | Tanaka et al. | |
| 2008/0320354 A1 | 12/2008 | Doppler et al. | |
| 2009/0073031 A1 | 3/2009 | Kim | |
| 2009/0103469 A1 | 4/2009 | Smith et al. | |
| 2009/0147699 A1 | 6/2009 | Ruy et al. | |
| 2009/0174600 A1 | 7/2009 | Mazlum et al. | |
| 2009/0204265 A1 | 8/2009 | Hackett | |
| 2009/0207769 A1 | 8/2009 | Park et al. | |
| 2009/0221283 A1 | 9/2009 | Soliman | |
| 2009/0257373 A1 | 10/2009 | Bejerano | |
| 2009/0312946 A1 | 12/2009 | Yoshioka et al. | |
| 2010/0008407 A1 | 1/2010 | Izumi et al. | |
| 2010/0074133 A1 | 3/2010 | Kim et al. | |
| 2010/0075704 A1 | 3/2010 | Mchenry et al. | |
| 2010/0110888 A1 | 5/2010 | Park et al. | |
| 2010/0128706 A1 | 5/2010 | Lee et al. | |
| 2010/0150048 A1 | 6/2010 | Tsai et al. | |
| 2010/0225541 A1 | 9/2010 | Hertzog et al. | |
| 2010/0226342 A1 | 9/2010 | Colling et al. | |
| 2010/0239042 A1 | 9/2010 | Hamalainen et al. | |
| 2010/0267407 A1 | 10/2010 | Liao et al. | |

(56) References Cited

U.S. PATENT DOCUMENTS

| | | |
|---|---|---|
| 2010/0278156 A1 | 11/2010 | Shin et al. |
| 2011/0070842 A1 | 3/2011 | Kwon et al. |
| 2011/0074552 A1 | 3/2011 | Norair et al. |
| 2011/0109464 A1 | 5/2011 | Lepley et al. |
| 2011/0119024 A1 | 5/2011 | Nam et al. |
| 2011/0125077 A1 | 5/2011 | Denison et al. |
| 2011/0188391 A1 | 8/2011 | Sella et al. |
| 2011/0208481 A1 | 8/2011 | Slastion |
| 2011/0210843 A1 | 9/2011 | Kummetz |
| 2011/0298598 A1 | 12/2011 | Rhee |
| 2011/0299422 A1 | 12/2011 | Kim et al. |
| 2011/0299423 A1 | 12/2011 | Shim et al. |
| 2012/0021758 A1 | 1/2012 | Gum et al. |
| 2012/0032855 A1 | 2/2012 | Reede et al. |
| 2012/0036198 A1 | 2/2012 | Marzencki et al. |
| 2012/0039310 A1 | 2/2012 | Dahl et al. |
| 2012/0071102 A1 | 3/2012 | Palomar et al. |
| 2012/0092155 A1 | 4/2012 | Abedi |
| 2012/0109420 A1 | 5/2012 | Lee et al. |
| 2012/0119902 A1 | 5/2012 | Patro et al. |
| 2012/0143383 A1 | 6/2012 | Cooperrider et al. |
| 2012/0171954 A1 | 7/2012 | Rudland et al. |
| 2012/0207062 A1 | 8/2012 | Corbellini et al. |
| 2012/0214512 A1 | 8/2012 | Siomina et al. |
| 2013/0023278 A1 | 1/2013 | Chin |
| 2013/0123981 A1 | 5/2013 | Lee et al. |
| 2013/0128867 A1 | 5/2013 | Calcev et al. |
| 2013/0138314 A1 | 5/2013 | Viittala et al. |
| 2013/0162459 A1 | 6/2013 | Aharony et al. |
| 2013/0170378 A1 | 7/2013 | Ray et al. |
| 2013/0170484 A1 | 7/2013 | Kang et al. |
| 2013/0184002 A1 | 7/2013 | Moshfeghi |
| 2013/0195083 A1 | 8/2013 | Kim et al. |
| 2013/0208667 A1 | 8/2013 | Merlin et al. |
| 2013/0225200 A1 | 8/2013 | Ben et al. |
| 2013/0273935 A1 | 10/2013 | Amizur et al. |
| 2013/0314229 A1 | 11/2013 | Tu et al. |
| 2013/0324154 A1* | 12/2013 | Raghupathy .......... H04W 4/025 |
| | | 455/456.1 |
| 2014/0015503 A1 | 1/2014 | Cheng |
| 2014/0015706 A1 | 1/2014 | Ishihara et al. |
| 2014/0016485 A1 | 1/2014 | Curticapean |
| 2014/0023049 A1 | 1/2014 | Strecker et al. |
| 2014/0046495 A1 | 2/2014 | Magnussen et al. |
| 2014/0056192 A1 | 2/2014 | Meylan et al. |
| 2014/0064252 A1 | 3/2014 | Lim et al. |
| 2014/0079224 A1 | 3/2014 | Nguyen et al. |
| 2014/0136093 A1 | 5/2014 | Banin et al. |
| 2014/0192695 A1 | 7/2014 | Priyantha et al. |
| 2014/0207281 A1 | 7/2014 | Angle et al. |
| 2014/0207282 A1 | 7/2014 | Angle et al. |
| 2014/0229519 A1 | 8/2014 | Dietrich et al. |
| 2014/0241308 A1 | 8/2014 | Hoffmann et al. |
| 2014/0242914 A1 | 8/2014 | Monroe |
| 2014/0247775 A1 | 9/2014 | Frenne et al. |
| 2014/0249688 A1 | 9/2014 | Ansari et al. |
| 2014/0293850 A1 | 10/2014 | Huang et al. |
| 2014/0341023 A1 | 11/2014 | Kim et al. |
| 2014/0361928 A1 | 12/2014 | Hughes et al. |
| 2015/0009047 A1 | 1/2015 | Ashkenazi et al. |
| 2015/0022338 A1 | 1/2015 | Hwang et al. |
| 2015/0023439 A1 | 1/2015 | Dimou et al. |
| 2015/0063138 A1 | 3/2015 | Aldana |
| 2015/0068069 A1 | 3/2015 | Tran et al. |
| 2015/0077241 A1 | 3/2015 | Contestabile et al. |
| 2015/0078232 A1 | 3/2015 | Djinki et al. |
| 2015/0079933 A1 | 3/2015 | Smith et al. |
| 2015/0098375 A1 | 4/2015 | Ree et al. |
| 2015/0156746 A1 | 6/2015 | Horne et al. |
| 2015/0168174 A1 | 6/2015 | Abramson et al. |
| 2015/0168536 A1 | 6/2015 | Banin et al. |
| 2015/0168537 A1 | 6/2015 | Amizur et al. |
| 2015/0172872 A1 | 6/2015 | Alsehly et al. |
| 2015/0249928 A1 | 9/2015 | Alicot et al. |
| 2015/0270882 A1 | 9/2015 | Shattil et al. |
| 2015/0296165 A1 | 10/2015 | Sato et al. |
| 2015/0296348 A1 | 10/2015 | Ghabra |
| 2015/0323934 A1 | 11/2015 | Lin et al. |
| 2015/0341101 A1 | 11/2015 | Park et al. |
| 2015/0341853 A1 | 11/2015 | Cho et al. |
| 2015/0349995 A1 | 12/2015 | Zhang et al. |
| 2015/0358938 A1 | 12/2015 | Richley et al. |
| 2015/0370272 A1 | 12/2015 | Reddy et al. |
| 2016/0009506 A1 | 1/2016 | Kelderman |
| 2016/0011673 A1 | 1/2016 | Moshfeghi et al. |
| 2016/0057708 A1 | 2/2016 | Siomina et al. |
| 2016/0097837 A1 | 4/2016 | Richley et al. |
| 2016/0147959 A1 | 5/2016 | Mariottini et al. |
| 2016/0164760 A1 | 6/2016 | Wakabayashi et al. |
| 2016/0188977 A1 | 6/2016 | Kearns et al. |
| 2016/0195600 A1 | 7/2016 | Feldman et al. |
| 2016/0198244 A1 | 7/2016 | Lund et al. |
| 2016/0198347 A1 | 7/2016 | Zhan et al. |
| 2016/0204822 A1 | 7/2016 | Yu et al. |
| 2016/0234008 A1 | 8/2016 | Hekstra et al. |
| 2016/0278076 A1 | 9/2016 | Agiwal et al. |
| 2016/0295499 A1 | 10/2016 | Tavildar et al. |
| 2016/0299213 A1 | 10/2016 | Jones et al. |
| 2016/0337811 A1 | 11/2016 | Aström et al. |
| 2016/0349353 A1 | 12/2016 | Wang et al. |
| 2016/0363648 A1 | 12/2016 | Mindell et al. |
| 2016/0373940 A1 | 12/2016 | Splitz et al. |
| 2017/0013584 A1 | 1/2017 | Banin et al. |
| 2017/0033958 A1 | 2/2017 | Eitan et al. |
| 2017/0048671 A1 | 2/2017 | Marri et al. |
| 2017/0055131 A1 | 2/2017 | Kong et al. |
| 2017/0059701 A1 | 3/2017 | Oh et al. |
| 2017/0070992 A1 | 3/2017 | Matsuo et al. |
| 2017/0078897 A1 | 3/2017 | Duan et al. |
| 2017/0094602 A1 | 3/2017 | Dinh et al. |
| 2017/0127410 A1 | 5/2017 | Ylamurto |
| 2017/0168135 A1 | 6/2017 | Want et al. |
| 2017/0188192 A1 | 6/2017 | Mujtaba et al. |
| 2017/0192435 A1 | 7/2017 | Bakhishev et al. |
| 2017/0212210 A1 | 7/2017 | Chen et al. |
| 2017/0280279 A1 | 9/2017 | Ghosh et al. |
| 2017/0332049 A1 | 11/2017 | Zhang |
| 2017/0332375 A1 | 11/2017 | Dinh et al. |
| 2017/0353940 A1 | 12/2017 | Seth et al. |
| 2017/0356979 A1 | 12/2017 | Georgiou et al. |
| 2017/0367065 A1 | 12/2017 | Seth et al. |
| 2018/0007516 A1 | 1/2018 | Ge et al. |
| 2018/0025641 A1 | 1/2018 | Lavelle et al. |
| 2018/0059678 A1 | 3/2018 | Bakhishev et al. |
| 2018/0063823 A1 | 3/2018 | Sampath et al. |
| 2018/0100915 A1 | 4/2018 | Beko et al. |
| 2018/0139517 A1 | 5/2018 | Schwartz et al. |
| 2018/0143285 A1 | 5/2018 | Sen et al. |
| 2018/0183650 A1 | 6/2018 | Zhang et al. |
| 2018/0206144 A1 | 7/2018 | Jiang et al. |
| 2018/0219869 A1 | 8/2018 | Kumar et al. |
| 2018/0249500 A1 | 8/2018 | Yoshimura et al. |
| 2018/0313661 A1 | 11/2018 | Eyster et al. |
| 2018/0324603 A1 | 11/2018 | Hessler et al. |
| 2018/0352443 A1 | 12/2018 | Hwang et al. |
| 2019/0014592 A1 | 1/2019 | Hampel et al. |
| 2019/0053061 A1 | 2/2019 | Sui et al. |
| 2019/0064315 A1 | 2/2019 | Ylamurto |
| 2019/0069263 A1 | 2/2019 | Ylamurto et al. |
| 2019/0069264 A1 | 2/2019 | Seth et al. |
| 2019/0076698 A1 | 3/2019 | Yang et al. |
| 2019/0086545 A1 | 3/2019 | Mooney et al. |
| 2019/0140879 A1 | 5/2019 | Haapola et al. |
| 2019/0140908 A1 | 5/2019 | Ma |
| 2019/0182705 A1 | 6/2019 | Chung et al. |
| 2019/0187236 A1 | 6/2019 | Ylamurto et al. |
| 2019/0197896 A1 | 6/2019 | Bakhishev et al. |
| 2019/0206231 A1 | 7/2019 | Armstrong et al. |
| 2019/0208483 A1 | 7/2019 | Luecke et al. |
| 2019/0250265 A1 | 8/2019 | Lu et al. |
| 2020/0029291 A1 | 1/2020 | Siomina |
| 2020/0053740 A1 | 2/2020 | Wigren et al. |

(56) References Cited

U.S. PATENT DOCUMENTS

| | | |
|---|---|---|
| 2020/0135028 A1 | 4/2020 | Bakhishev et al. |
| 2020/0309531 A1 | 10/2020 | Cui et al. |
| 2021/0286043 A1 | 9/2021 | Shpak |

FOREIGN PATENT DOCUMENTS

| | | |
|---|---|---|
| CN | 103974442 A | 8/2014 |
| CN | 104755954 A | 7/2015 |
| CN | 105407463 A | 3/2016 |
| EP | 1425867 A1 | 6/2004 |
| EP | 2847611 A1 | 3/2015 |
| EP | 3047296 A1 | 7/2016 |
| EP | 3251426 A1 | 12/2017 |
| EP | 3373647 A1 | 9/2018 |
| EP | 3466165 A1 | 4/2019 |
| JP | S6389976 A | 4/1988 |
| JP | 2008537871 A | 9/2008 |
| JP | 2010251887 A | 11/2010 |
| JP | 2013172227 A | 9/2013 |
| JP | 2014135764 A | 7/2014 |
| JP | 2016514250 A | 5/2016 |
| JP | 2019510980 A | 4/2019 |
| KR | 20110098117 A | 9/2011 |
| KR | 20110109709 A | 10/2011 |
| KR | 20120122806 A | 11/2012 |
| KR | 20140126790 A | 11/2014 |
| KR | 20160017951 A | 2/2016 |
| WO | 0110154 A1 | 2/2001 |
| WO | 2006015265 A2 | 2/2006 |
| WO | 2006067271 A1 | 6/2006 |
| WO | 2006113023 A1 | 10/2006 |
| WO | 2007067821 A2 | 6/2007 |
| WO | 2010143756 A2 | 12/2010 |
| WO | 2013106441 A1 | 7/2013 |
| WO | 2013166546 A1 | 11/2013 |
| WO | 2014007417 A1 | 1/2014 |
| WO | 2014193335 A1 | 12/2014 |
| WO | 2014197585 A1 | 12/2014 |
| WO | 2015092825 A1 | 6/2015 |
| WO | 2015099925 A1 | 7/2015 |
| WO | 2015134270 A1 | 9/2015 |
| WO | 2016011433 A2 | 1/2016 |
| WO | 2016123249 A1 | 8/2016 |
| WO | 2017030362 A1 | 2/2017 |
| WO | 2017120315 A1 | 7/2017 |
| WO | 2017210359 A1 | 12/2017 |
| WO | 2018070863 A1 | 4/2018 |
| WO | 2019040556 A1 | 2/2019 |
| WO | 2019040559 A1 | 2/2019 |
| WO | 2019040560 A1 | 2/2019 |
| WO | 2019051040 A2 | 3/2019 |
| WO | 2020139886 A1 | 7/2020 |
| WO | 2020139887 A1 | 7/2020 |
| WO | 2020139888 A1 | 7/2020 |
| WO | 2020139889 A1 | 7/2020 |

OTHER PUBLICATIONS

Notice of Allowance for U.S. Appl. No. 15/173,531, dated Mar. 31, 2020, 9 pages.

Notice of Allowance received in U.S. Appl. No. 15/684,891 dated May 15, 2019.

Notice of Allowance, U.S. Appl. No. 16/595,134, dated Aug. 18, 2021, 14 pages, USPTO.

Notice of Allowance received in U.S. Appl. No. 14/607,050 dated Aug. 9, 2016.

Non-Final Office Action, U.S. Appl. No. 16/894,023, dated Nov. 9, 2021, 26 pages. USPTO.

Notice of Allowance received in U.S. Appl. No. 14/830,668 dated Apr. 20, 2017.

O. Bialer et al., "Location Estimation In Multipath Environments With Unsynchronized Base Stations," 2016, 5 pages, IEEE.

Office Action received in U.S. Appl. No. 16/894,023 dated Jun. 29, 2022.

Sarkar Tapan K. et al., "Using the Matrix Pencil Method to Estimate the Parameters of a Sum of Complex Exponentials", IEEE Antennas and Propagation Magazine, vol. 37, No. 1, Feb. 1995.

Shang, Yi, et al., "Improved MDS-Based Localization", INFOCOM 2004. Twenty-third Annual Joint Conference of the IEEE Computerand Communications Societies, Year: 2004, vol. 4, 12 pages.

Wang, Yue, "Linear least squares localization in sensor networks", EURASIP Journal on Wreless Communications and Networking, 7 pages, (2015).

Notice of Allowance received in U.S. Appl. No. 14/830,671 dated Aug. 9, 2016.

Notice of Allowance received in U.S. Appl. No. 14/925,889 dated Jul. 1, 2019.

Notice of Allowance received in U.S. Appl. No. 15/672,128 dated Jun. 15, 2018.

Notice of Allowance received in U.S. Appl. No. 16/681,060 dated Nov. 4, 2021.

Notice of Allowance received in U.S. Appl. No. 16/727,566 dated Feb. 5, 2021.

Office Action from U.S. Appl. No. 16/681,060, 25 pages, dated Jul. 30, 2020.

Office Action Received in U.S. Appl. No. 14/607,045 dated Jan. 4, 2016.

Office Action Received in U.S. Appl. No. 14/607,045 dated Apr. 7, 2015.

Office Action received in U.S. Appl. No. 14/607,047 dated Aug. 14, 2020.

Office Action received in U.S. Appl. No. 14/607,047 dated Dec. 12, 2016.

Office Action received in U.S. Appl. No. 14/607,047 dated Jun. 9, 2016.

Office Action received in U.S. Appl. No. 14/607,048 dated Dec. 16, 2016.

Office Action received in U.S. Appl. No. 14/607,048 dated Jun. 13, 2016.

Office Action received in U.S. Appl. No. 14/607,048 dated Sep. 21, 2017.

Office Action received in U.S. Appl. No. 14/607,050 dated Feb. 18, 2016.

Office Action received in U.S. Appl. No. 14/830,671 dated Apr. 5, 2017.

Office Action received in U.S. Appl. No. 14/925,889 dated Dec. 4, 2018.

Office Action received in U.S. Appl. No. 14/925,889 dated Sep. 28, 2017.

Office Action received in U.S. Appl. No. 14/925,889 dated Dec. 28, 2017.

Office Action received in U.S. Appl. No. 14/925,889 dated Feb. 9, 2017.

Office Action received in U.S. Appl. No. 15/672,128 dated Jan. 10, 2018.

Office Action received in U.S. Appl. No. 16/040,133 dated Nov. 5, 2020.

Simonetto, Andrea et al., "Distributed Maximum Likelihood Sensor Network Localization", IEEE Transactions on Signals Processing, vol. 62, No. 6, Mar. 15, 2014, pp. 1424-1437.

Song, Liang, et al., "Matrix pencil for positioning in wireless ad hoc sensor network", In Wireless Sensor Networks, pp. 18-27. Springer Berlin Heidelberg2004.

Sugano, Masashi, et al., "Low-Energy-Consumption Ad Hoc Mesh Network Based on Intermittent Receiver-driven Transmission", ICGNST-SNIR Journal, vol. 9, Issue 1, Jul. 2009, 8 pages.

T. Sarkar and O. Pereira, "Using the Matrix Pencil Method to Estimate the Parameters of a Sum of Complex Exponentials," IEEE Antennas and Propagation Magazine, Feb. 1995, 8 pages, vol. 37, No. 1, IEEE.

Office Action received in U.S. Appl. No. 16/040,133 dated Feb. 20, 2020.

Xie, Yaxiong, et al., "Precise Power Delay Profiling with Commodity WiFi", MobiCom '15, Sep. 7-11, 2015, Paris, France, 12 pages.

(56) References Cited

OTHER PUBLICATIONS

Vera, Jesus S., "Efficient Multipath Mitigation in Navigation System", Ph. D. dissertation, Universitat Politecnica de Catalunya. Dec. 9, 2003 158 pages.

Wang, Yue, "Linear least squares localization in sensor networks", EURASIP Journal on Wireless Communications and Networking, 7 pages, (2015).

Warahena Liyanage Ashanie De Alwis Gunathillake. Maximum Likelihood Coordinate Systems for Wire less Sensor Networks: from physical coordinates to topology coordinates. University of New Sou th Wales, School of Electrical Engineering and Telecommunications, Faculty of Engineering , Jul. 2018 , pp. 1-198. See pp. 11-97.

Wibowo, Sigit B., et al., "Time of Flight Ranging using Off-the-self UEEE802.11 WiFi Tags", Centre for Adaptive Wireless Systems, Department of Electronic Engineering, Cork Institute of Technology, Bishopstown, Cork, Ireland, Dec. 2008, 5 pages.

Xinghong Kuang and Huihe Shao, Maximum Likelihood Localization Algorithm Using Wireless Sensor 2006; First International Conference on Innovative Computing, Information and Control (ICICIC'06).

Xiong Cai et al., "Identification and Mitigation of NLOS Based on Channel State Information for Indoor WiFi Localization," 2015, 5 pages, IEEE.

Yang, Zheng , et al., "From RSSI to CSI: Indoor localization via channel response", ACM Computing Surveys (CSUR) 46, No. 2 (2013), article 25 32 pages.

Youssef, A., et al., "Accurate Anchor-Free Node Localization in Wireless Sensor Networks", PCCC 2005. 24th IEEE International Performance, Computing, and Communications Conference, 2005, 14 pages.

Office Action received in U.S. Appl. No. 16/040,133 dated Mar. 31, 2021.

Office Action received in U.S. Appl. No. 16/040,133 dated Nov. 29, 2021.

Final Office Action, U.S. Appl. No. 16/283,478, dated Aug. 4, 2021, 31 pages, USPTO.

Final Office Action, U.S. Appl. No. 16/283,478, dated Jun. 5, 2020, 21 pages, USPTO.

Issue Notification received in U.S. Appl. No. 16/283,470, dated Jan. 15, 2020.

Non-Final Office Action for U.S. Appl. No. 17/371,963 dated Apr. 18, 2023.

Non-Final Office Action, U.S. Appl. No. 16/283,465, dated Jun. 8, 2021, 19 pages, USPTO.

Non-Final Office Action, U.S. Appl. No. 16/283,478, dated Oct. 16, 2020, 28 pages, USPTO.

Notice of Allowance received for U.S. Appl. No. 15/684,894, 9 pages, dated Apr. 10, 2019.

Notice of Allowance Received in U.S. Appl. No. 16/521,384 dated Dec. 16, 2020.

Notice of Allowance, U.S. Appl. No. 16/283,474, dated May 22, 2020, 9 pages, USPTO.

Notice of Allowance, U.S. Appl. No. 16/283,478, dated Jan. 12, 2022, 10 pages, USPTO.

Notice of Publication for CN2018800550169 (Pub. No. CN111066352A), 4 pages, dated Apr. 24, 2020.

Office Action from U.S. Appl. No. 16/260,608, 14 pages, dated Sep. 13, 2019.

Office Action from U.S. Appl. No. 16/277,736, 8 pages, dated Jan. 29, 2020.

Office Action from U.S. Appl. No. 16/283,470, dated May 2, 2019, 16 pages.

Office Action from U.S. Appl. No. 16/283,474, dated Dec. 9, 2019, 13 pages.

Office Action from U.S. Appl. No. 16/283,478, dated Nov. 5, 2019, 18 pages.

Office Action from U.S. Appl. No. 16/283,780, dated Jul. 9, 2019, 51 pages.

Office Action received U.S. Appl. No. 15/684,894 dated Oct. 22, 2018.

Office Action received in U.S. Appl. No. 15/684,895 dated Apr. 30, 2019.

Office Action received in U.S. Appl. No. 15/684,895 dated Mar. 30, 2020.

Office Action received in U.S. Appl. No. 15/684,895 dated Oct. 24, 2019.

Office Action received in U.S. Appl. No. 16/521,384 dated Aug. 17, 2020.

Xu, Yurong , et al., "Mobile Anchor-Free Localization for Wireless Sensor Networks", Distributed Computing in Sensor Systems, Third IEEE International Conference, DCOSS 2007, Santa Fe, NM, USA, Jun. 18-20, 2007, pp. 96-109.

Office Action received in U.S. Appl. No. 16/198,604 dated Apr. 23, 2019.

Corrected Notice of Allowance received in U.S. Appl. No. 15/173,531 dated Jun. 17, 2020.

Office Action received in U.S. Appl. No. 16/727,566 dated Aug. 13, 2020.

Staudinger et al., "Round-Trip Delay Ranging with OFDM Signals—Performance Evaluation with Outdoor Experimentation," 2014, 7 pages, IEEE.

Office Action received in U.S. Appl. No. 17/674,251 dated Jun. 15, 2023.

Paradiso, Joseph A., et al., "Energy scavenging for mobile and wireless electronics", Pervasive Computing, IEEE 4 No. 1 (2005): pp. 18-27.

Patwari, Neal , et al., "Locating the nodes: cooperative localization in wireless sensor networks", Signal Processing Magazine, IEEE 22 No. 4 (2005): pp. 54-69.

Savarese, Chris , et al., "Location in distributed ad-hoc wireless sensor networks", Acoustics, Speech, and Signal Processing, 2001. Proceedings.(ICASSP'01). 2001 IEEE International Conference on, vol. 4, pp. 2037-2040. IEEE2001.

Schatzberg, Uri, et al., "Enhanced WiFi ToF Indoor Positioning System with MEMS-based INS and Pedometric Information", 2014 IEEE/ION Position, Location and Navigation Symposium, May 5-8, 2014, 8 pages.

Notice of Allowance received in U.S. Appl. No. 16/681,060 dated Jan. 10, 2022.

Schmid, Thomas , et al., "Disentangling wireless sensing from mesh networking", Proceedings of the 6th Workshop on Hot Topics in Embedded Networked Sensors, p. 3. ACM, Jun. 28 2010.

Final Office Action from U.S. Appl. No. 14/988,617, dated Sep. 20, 2017, 22 pages.

Issue Notification received in U.S. Appl. No. 14/988,617 dated Dec. 18, 2018.

Non-Final Office Action from U.S. Appl. No. 14/988,617), dated Mar. 8, 2018, 25 pages.

Notice of Allowance for U.S. Appl. No. 16/198,604, dated Oct. 21, 2019, 8 pages.

Notice of Allowance from U.S. Appl. No. 14/988,617, dated Aug. 14, 2018, 13 pages.

Office Action for U.S. Appl. No. 16/198,604, dated Apr. 23, 2019 pages, dated Apr. 23, 2019.

Vullers, Ruud J., et al., "Energy harvesting for autonomous wireless sensor networks", Solid-State Circuits Magazine, IEEE 2 No. 2 (2010): pp. 29-38.

International Search Report received in PCT/US2016/015188 dated Jul. 4, 2016.

Zang, Yan , et al., "Research on Node Localization for Wireless Sensor Networks", 2013 International Conference on Mechatronic Sciences, Electric Engineering and Computer (MEC), pp. 3665-3668, Dec. 20, 2013.

U.S. Appl. No. 17/152,719, filed Jan. 19, 2021, Philip Kratz.

A. Simonetto and G. Leus, "Distributed Maximum Likelihood Sensor Network Localization," Mar. 15, 2014, pp. 1424-1437, vol. 62, No. 6, IEEE.

Adel Youssef et al., "Accurate Anchor-Free Node Localization in Wireless Sensor Networks," PCCC, 2005, 14 pages, IEEE.

(56) References Cited

OTHER PUBLICATIONS

Ahmed, Khawza I., et al., "Improving Two-Way Ranging Precision with Phase-offset Measurements", In Global Telecommunications Conference, 2006. GLOBECOM'06. IEEE (pp. 1-6). IEEE.
Akyildiz, Ian F., et al., "Wireless mesh networks: a survey", Computer networks 47No. 4 (2005): pp. 445-487.
Anastasi, Giuseppe, et al., "Energy conservation in wireless sensor networks: A survey", Ad Hoc Networks 7No. 3 (2009): pp. 537-568.
Baghaei-Nejad, Majid, et al., "Low cost and precise localization in a remote-powered wireless sensor and identification system", Electrical Engineering (ICEE), 2011 19th Iranian Conference on, pp. 1-5. IEEE, May 17-192011.
Banin, Leor, et al., "Next Generateion Indoor Positioning System Based on WiFi Time of Flight" 26th International Technical Meeting of the Satellite Division of the Institute of Navigation, Nashville TN, Sep. 16-20, 2013, 9 pages.
Buratti, Chiara, et al., "An overview on wireless sensor networks technology and evolution", Sensors 9No. 9 (2009): pp. 6869-6896.
Chan, Y. T., et al., "A Simple and Efficient Estimator for Hyperbolic Location", IEEE Transactions on Signal Processing, Year: 1994, vol. 42, Issue: 8, 11 pages.
Cohn, Gabe, et al., "SNUPI: Sensor Nodes Utilizing Powerline Infrastructure", UbiComp '10, Sep. 26-29, 2010, Copenhagen, Denmark10 pages.
Corrected Notice of Allowance, U.S. Appl. No. 15/173,531, dated Jul. 23, 2020, 8 pages, USPTO.
D. Giustiniano and S. Mangold, "CAESAR: Carrier Sense-Based Ranging in Off-The-Shelf 802.11 Wireless LAN," 2011, 12 pages, ACM.
D. Vasisht et al., "Decimeter-Level Localization with a Single WiFi Access Point," 2016, 15 pages, USENIX.
D. Vasisht et al., "Sub-Nanosecond Time of Flight on Commercial Wi-Fi Cards," May 13, 2015, 14 pages.
Darif, Anouar, et al., "Performance Evaluation of IR-UWB Compared to Zigbee in Real time Applications for Wireless Sensor Networks", Journal of Convergence Information Technology 8No. 15 (2013).
Doherty, Lance, et al., "Convex position estimation in wireless sensor networks", INFOCOM 2001. Twentieth Annual Joint Conference of the IEEE Computer and Communications Societies. Proceedings. IEEE, vol. 3, pp. 1655-1663. IEEE2001.
Farnsworth, Bradley, et al., "High Precision Narrow-Band RF Ranging"In Proceedings of the 2010 International Technical Meeting of the Institute of Navigation (pp. 161-166).
Farnsworth, Bradley, et al., "High-precision 2.4 GHz DSSS RF ranging", Proceedings of the 2011 International Technical Meeting of the Institute of Navigation. 20116 pages.
Farnsworth, Bradley D., et al., "Precise, Accurate, and Multipath-Resistant Networked Round-Trip Carrier Phase RF Ranging", Proceedings of the 2015 International Technical Meeting of the Institute of Navigation, Dana Point, California, Jan. 2015pp. 651-656.
Final Office Action from U.S. Appl. No. 16/681,060, dated Dec. 15, 2020, pp. 1-51.
Final Office Action, U.S. Appl. No. 15/173,531, dated Sep. 30, 2019, 9 pages, USPTO.
Franceschini, Fiorenzo, et al., "A review of localization algorithms for distributed wireless sensor networks in manufacturing", International journal of computer integrated manufacturing 22No. 7 (2009): 698-716.
Gezici, Sinan, et al., "Localization via ultra-wideband radios: a look at positioning aspects for future sensor networks", Signal Processing Magazine, IEEE 22No. 4 (2005): pp. 70-84.
Giustiniano, Domenico, et al., "CAESAR: Carrier Sense-Based Ranging in Off-The-Shelf 802.11 Wireless LAN", ACM CoNEXT 2011, Dec. 6-9, 2011, Tokyo, Japan, 12 pages.
Gutierrez, Jose A., et al., "IEEE 802.15. 4: a developing standard for low-power low-cost wireless personal area networks", network, IEEE 15No. 5 (2001): pp. 12-19.

International Search Report and the Written Opinion of the International Searching Authority for PCT/US2016/047428 dated Nov. 11, 2016, 10 pages.
International Search Report received in PCT/US2017/012304 dated Mar. 30, 2017.
Isokawa, Teijiro, et al., "An Anchor-Free Localization Scheme with Kalman Filtering in ZigBee Sensor Network", Hindawi Publishing Corporation, ISRN Sensor Networks, vol. 2013 (Jan. 23, 2013) Article ID 356231, 11 pages.
Issue Notification received in U.S. Appl. No. 14/607,047 dated Jun. 21, 2017.
Issue Notification received in U.S. Appl. No. 14/925,889 dated Oct. 2, 2019.
Issue Notification received in U.S. Appl. No. 15/697,284 dated Oct. 16, 2019.
Issue Notification received in U.S. Appl. No. 16/727,566 dated May 19, 2021.
Jin, H. H., "Scalable sensor localization algorithms for wireless sensor networks", Doctoral dissertation, University of Toronto, 2005106 pages.
Karalar, Tufan, et al., "Implementation of a Localization System for Sensor Networks", (No. UCB/EECS-2006-69). California Univ Berkeley Dept of Electrical Engineering and Computer Science, May 18, 2006173 pages.
Kellogg, Bryce, et al., "Wi-Fi Backscatter: Internet connectivity for RF-powered devices", Proceedings of the 2014 ACM conference on SIGCOMM, pp. 607-618. ACM2014.
Kinney, Patrick, et al., "technology: Wireless control that simply works", Communications design conferencevol. 2. 2003.
Konig, S., et al., "Precise time of flight measurements in IEEE 802.11 networks by cross-correlating the sampled signal with a continuous Barker code", In Mobile Adhoc and Sensor Systems (MASS), 2010 IEEE 7th International Conference on, pp. 642-649. IEEE2010.
Kotaru, Manikanta, et al., "SpotFi: Decimeter Level Localization Using WiFi", SIGCOMM '15, Aug. 17-21, 2015, London, United Kingdom, 14 pages.
Lanzisera, Steven, et al., "RF Ranging for Location Awareness", Doctoral dissertation, University of California, Berkeley, May 19, 2009103 pages.
Lanzisera, Steven, et al., "RF Time of Flight Ranging for Wireless Sensor Network Localization", Intelligent Solutions in Embedded Systems, 2006 International Workshop on, vol. No., pp. 1,12, Jun. 30—302006.
Lee, Jin-Shyan, et al., "A comparative study of wireless protocols: Bluetooth, UWB, ZigBee, and Wi-Fi", Industrial Electronics Society, 2007. IECON 2007. 33rd Annual Conference of the IEEE, pp. 46-51. IEEE2007.
Lee, Myung J., et al., "Emerging standards for wireless mesh technology", Wireless Communications, IEEE 13No. 2 (2006): pp. 56-63.
LG Electronics, "Discussions on Combination of DL & UL based Positioning", Agenda Item: 7.2.10.1.3, 3GPP TSG RAN WG1 #96, R1-1902101, Athens, Greece (2019).
Makki, A., et al., "High-resolution time of arrival estimation for OFDM-based transceivers", Electronics Letters 51, No. 3 (2015)pp. 294-296.
Mamechaoui, Sarra, et al., "A survey on energy efficiency for wireless mesh network", iarXiv preprint arXiv:1304.3904 (2013).
Mao, Guoqiang, et al., "Localization Algorithms and Strategies for Wireless Sensor Networks", IGI Global2009.
Mariakakis, Alex et al., "SAIL: Single Access Point-Based Indoor Localization", 14 pages, 2014.
N. Priyantha et al., "Anchor-Free Distributed Localization in Sensor Networks," Tech Report #892, Apr. 15, 2003, 13 pages, MIT.
Non-Final Office Action, U.S. Appl. No. 15/173,531, dated Mar. 18, 2019, 15 pages, USPTO.
Non-Final Office Action, U.S. Appl. No. 15/697,284, dated Feb. 26, 2019, 14 pages, USPTO.

* cited by examiner

METHOD AND SYSTEM FOR RADIOLOCATION ASSET TRACKING VIA A MESH NETWORK

CROSS REFERENCE TO RELATED APPLICATION

This application is a continuation application of U.S. patent application Ser. No. 16/864,024, filed on Apr. 30, 2020, which is a continuation application of U.S. patent application Ser. No. 16/559,495, filed on Sep. 3, 2019, which is a continuation application of U.S. patent application Ser. No. 15/644,717, filed on Jul. 7, 2017, which claims the benefit of U.S. Provisional Application 62/360,446 filed on Jul. 10, 2016, all of which are incorporated in their entireties by this reference.

TECHNICAL FIELD

This disclosure relates to a method and system for locating and tracking radio frequency (RF) transmitters associated with assets; more specifically, to radiolocation of RF transmitters using time difference of arrival or frequency difference of arrival (TDoA/FDoA) and multilateration (MLAT) via a mesh network of RF transponders.

BACKGROUND

Global navigation satellite systems (GNSS) are networks of geostationary satellites for geo-spatial positioning using time of arrival (ToA) measurements from line of sight (LoS) radio communications with satellites to calculate position to a high level of accuracy, usually several meters, and simultaneously calculate local time to high precision. The Global Positioning System (GPS) is a GNSS developed and maintained by the US Department of Defense (DoD); other GNSS include GLONASS (Russia), BeiDou (China), GALILEO (Europe), and IRNSS (India). GPS specifically is divided into two classes: SPS, for civilian use, and PPS, for military use which uses two frequencies for ionospheric correction. GPS and GNSS have found myriad uses in civilian, commercial, and military applications for locating and tracking people, goods, and physical capital. However, while standard in many consumer products, including smartphones and automobile navigation systems, GNSS is ineffective at locating in indoor or in urban environments, where the radio signals from the GNSS satellites are blocked by intervening metal or dielectric structures, such as roofs, walls, and windows. Furthermore, implementations of GNSS require LoS radio communications with at least four GNSS satellites, limiting the geographic availability in developing GNSS networks, such as BeiDou and IRNSS, and locations where multipath propagation due to reflections of electromagnetic signals from structures is an issue, such as in urban canyons or indoor environments.

A number of technologies, originally developed for mitigating multipath propagation in radio direction finding applications, have found use in GPS. Since GPS signals are based on sky wave propagation, ground wave attenuation techniques effectively mitigate multipath reflection. An example is choke-ring antennas, developed at NASA Jet Propulsion Laboratory (JPL) and currently licensed by patent holders to Trimble Navigation and Magellan Professional Products for use in GPS receivers.

Radio direction finding (RDF), commonly used in aircraft and marine navigation, such as Decca Navigator Systems and LORAN, in civilian and military applications, as well as amateur radio, is a series of methods for determining the direction or bearing of a radio frequency (RF) transmitter. RDF may be used for determining the location of an RF transmitter, a process called radiolocation, using multilateration (MLAT), based on time difference of arrival or frequency difference of arrival (TDoA/FDoA), or multiangulation, based on angle-of-arrival (AoA). AoA may be determined using directional antennas, such Adcock, Watson-Watt and associated signal processing techniques such as the Butler Matrix, or by measuring phase differences between individual elements in antenna arrays, such as Correlation Interferometry. TDoA/FDoA requires synchronization to a common time base, which is conventionally an absolute time reference with a high level of timing accuracy, such as an atomic clock.

An active area of research and development for market applications are so-called indoor positioning systems (IPS), local positioning system (LPS), and real-time locating systems (RTLS), which use information from a variety of sensors, such as Wi-Fi, Bluetooth, magnetic positioning, infrared, motion sensing, acoustic signals, inertial measurement, LIDAR, and machine vision, to locate physical objects or personnel in indoor environments or urban canyons where traditional GPS is ineffective. These technologies may be complemented with ToA synchronization, such as from using pseudolites or self-calibrating pseudolite arrays (SCPAs), with positional accuracy under 1 meter in some cases. A pseudolite is typically a local, ground-based transceiver used as an alternative to GPS.

IPS may be implemented at choke points, as a dense network of short-range sensors, or long-range sensors based on AoA, ToA, or received signal strength indication (RSSI.) The feasibility and cost-effectiveness of IPS has been increasing with the current and future trend towards larger numbers of indoor antennas at access points for cellular and wireless communications, as in the case of multiple-input and multiple-output (MIMO). This has been driven by the demand for increased coverage indoors and the emerging 5G telecommunications network standard, which will have smaller cell sizes due to the use of higher transmission frequencies with shorter propagation ranges, with the goal of spectrum reuse, and networking of buildings, vehicles, and other equipment for Web access, sometimes informally referred to as the "Internet of Things" or IoT.

Several commercial solutions exist for mobile phone tracking. These are based on tracking of GPS-capable smartphones, Wi-Fi-capable smartphones or feature phones, and cellular positioning. The US government specifies a worst case pseudorange accuracy of 7.8 m at 95% confidence level for GPS. For a 3G iPhone, the positional accuracy for these three techniques has been established at ~8 m, ~74 m, and ~600 m, respectively. External GPS hardware may be used with smartphones and feature phones for additional positioning accuracy, such as XGPS150A, with a positional accuracy of ~2.5 m.

Wi-Fi positioning is currently a developing technology for tracking, and is based on signal tracking of transmissions from wireless devices, wireless access points (WAPs), and routers. Packet monitoring can provide the MAC address of the transmitting device and signal strength through received signal strength indication (RSSI), which may be used for locating the device. Wi-Fi positioning has a propagation range of ~100 m, and at least 1-5 m positional accuracy. This technique is most effective in urban environments with a large number of signals. Wi-Fi positioning has been implemented in systems based on the range of the transmitting device from a receiver or AoA with antenna arrays, which may be implemented on commodity wireless access points (WAPs) by taking advantage of existing MIMO capabilities and developing various additional signal processing capabilities into software, such as multiple signal classification (MUSIC).

The drawbacks with these existing techniques are that they either have extremely limited positional accuracy and coverage indoors, such as GPS/GNSS, are applicable for only certain communication protocols like Wi-Fi positioning, are not robust to data collection artifacts such as machine vision using cameras, or require extensive hardware infrastructures to support like machine vision and Wi-Fi positioning. The latter consideration is especially relevant, as it presents a limiting factor to the market adoption of a particular technology for tracking purposes due to cost and implementation barriers. Furthermore, the accuracy requirements are more stringent for indoor positioning, where it is often desirable to achieve accuracy on the 1 meter scale or smaller to provide location information within a single room in a building.

SUMMARY

One embodiment is a method of tracking a third-party transmitter, in a mesh network of nodes having a common reference clock between nodes. The method includes receiving, at a node, a transmitted signal at a first node from the third-party transmitter, demodulating the transmitted signal at the first node to produce a demodulated local signal, receiving, from at least a second node in the mesh network, a demodulated remote signal, autocorrelating the demodulated local signal and the demodulated remote signal to recover first timing differences between the demodulated remote signal and the demodulated local signal, and using the first timing difference to acquire a location of the third-party transmitter.

Another embodiment is a method of tracking third-party transponders. The method includes receiving, at a receiver located in a defined space, a signal from a previously-unknown, third-party transmitter, assigning an identifier to the third-party transmitter, using radiolocation to track a location of the third-party transmitter using the identifier in the defined space, recording the location and movement data of the third-party transmitter while the third-party transmitter is in the space, and releasing the identifier when the third-party transmitter leaves the space.

Another embodiment is a method of determining a reference clock in a mesh network. The method includes receiving, at a first node in the network, multiple signals from a second node in the mesh network, correlating, at the first node, the multiple signals with a local signal generated by the first node to determine a coarse set of time differences, refining the coarse set of time differences using a phase of a carrier signal of the multiple signals to produce a refined set of time differences, and using the set of time differences to define a reference clock for use in the mesh network.

DETAILED DESCRIPTION OF THE EMBODIMENTS

Figure 1:
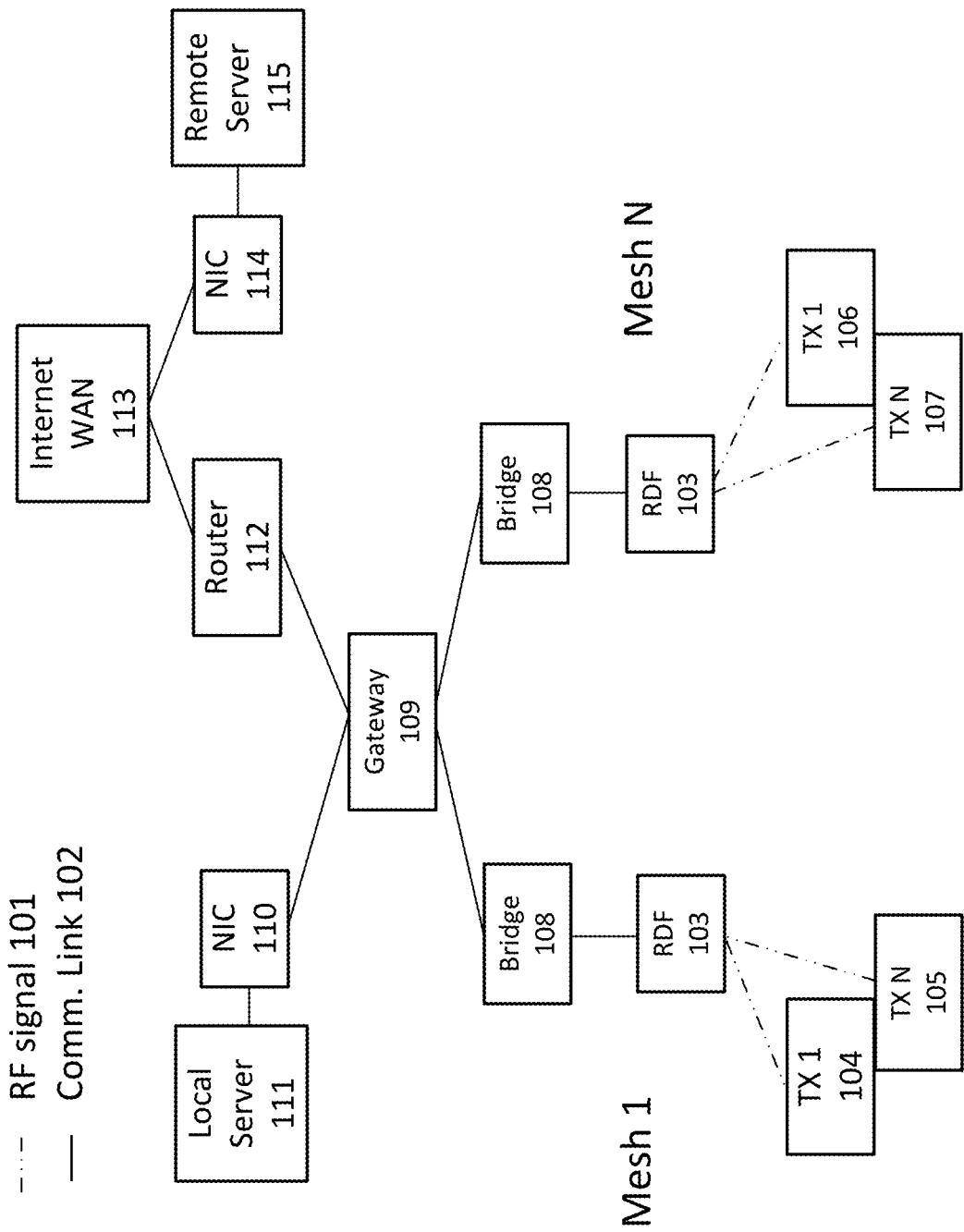
FIG. 1 is an embodiment of system-level block diagram for radiolocation and radio direction finding (RDF) using communications between a plurality of radio frequency (RF) transponders over a mesh network.

The terminology used herein is for describing particular embodiments only and is not intended to be limiting of the scope of the claims. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms, including technical and scientific terms, used herein have the same meaning as commonly understood by one having ordinary skill in the art to which these embodiments belong. It will be further understood that terms, such as those defined in commonly used dictionaries, should be interpreted as having a meaning that is consistent with their meaning in the context of the relevant art and present disclosure and will not be interpreted in an idealized or overly formal sense unless expressly so defined herein.

In describing the embodiments, it will be understood that several techniques and steps are disclosed. Each of these has individual benefit and each can also be used in conjunction with one or more, or in some cases all, of the disclosed techniques. Accordingly, for the sake of clarity, the description will refrain from repeating every possible combination of the individual steps in an unnecessary fashion. Nevertheless, the specification and claims should be read with the understanding that such combinations are entirely within the scope of the embodiments and the claims.

A method for tracking of assets based on data from a radiolocation system with the purpose of identifying both the current location, path, and/or duration in location per asset is described herein. Here, asset includes tracking any item of value or interest, such as but not limited to personnel, mobile phones, or tagged devices which may include radio-frequency tags such as radio frequency identification (RFID) tags. In the following description, for purposes of explanation, numerous specific details and use cases are set forth in order to provide a thorough understanding of the present embodiments. It will be evident, however, to one skilled in the relevant art that the present embodiments may be practiced without these specific details.

The present disclosure is to be considered as an exemplification of the embodiments, and is not intended to limit the scope of the claims to the specific embodiments illustrated in the figures or description below.

The process described in the present embodiments is very valuable as it can be used to enhance practices in many industries including public safety, military security, retail, and supply chain logistics, to name just a few. Below are several examples of how asset tracking using a radio direction finding system over a local area network can be applied.

Example 1: Public Safety

The process can be applied to track people exposed to a dirty bomb in an airport. In one embodiment, the radiolocation mesh network could track all mobile phones that were turned on and within the exposure radius over a designated time period. Then all persons associated with said mobile phones could be contacted and appropriate measures taken to quarantine those exposed in an effort to contain the spread of a potentially contagious biological or chemical agent.

Example 2: Military Base Security

A base set up with the mesh network of radiolocation transponders described in the present embodiments could detect where persons are at all times. Further it could determine if persons carrying phones that are not registered in a central operations database were walking around unescorted. It could also help inform preemptive security protocols as system operators could determine whether someone who is approaching the base from the outside has valid security clearance.

Example 3: Retail Innovation

Retail stores with the network could gain customer segmentation data based on shopping traffic patterns. For example, a store could identify a subset of people who walk in the store that do not make a purchase and then see how long they were in the store and where in the store they walked. They could then use this data to optimize store layout and placement of in-store promotions.

Example 4: Supply Chain Logistics

Assets could be fitted with tags that could be tracked within a warehouse. The network could track assets anywhere within the warehouse up to the receiver range. This could be used to sync inventory management with enterprise resource planning (ERP) systems, reduce inventory shrinkage, and assist with inventory item picking.

The embodiments will now be described by referencing the appended figures representing preferred embodiments. One skilled in the relevant art would appreciate that these various sections can be omitted or rearranged or adapted in various ways.

FIG. 1 shows a functional block diagram of a system-level description for radiolocation and radio direction finding (RDF) using communications between a plurality of radio frequency (RF) transponders in a mesh network. In the embodiments, the transponders 103 nodes in the network may consist of radio frequency (RF) transceivers, digital signal processors (DSPs), field programmable gate arrays (FPGAs), and other hardware and software for determining the locations of a plurality of transmitters (TX) 104-107, which may consist of RF tags or mobile stations (MS), for each mesh network.

As used here, the term 'transponder' indicates a node in the mesh network. The nodes form the mesh network and may have a fixed location, or may move around the location, such as in on a vehicle or other mobile station. The term 'transmitter' may indicate a third-party transmitter of which the mesh network has no prior knowledge, and known transmitters that cooperate with the system. These transmitters may include cell phones with Wi-Fi capability, tablets, computers, RFID tags, etc.

Figure 2:
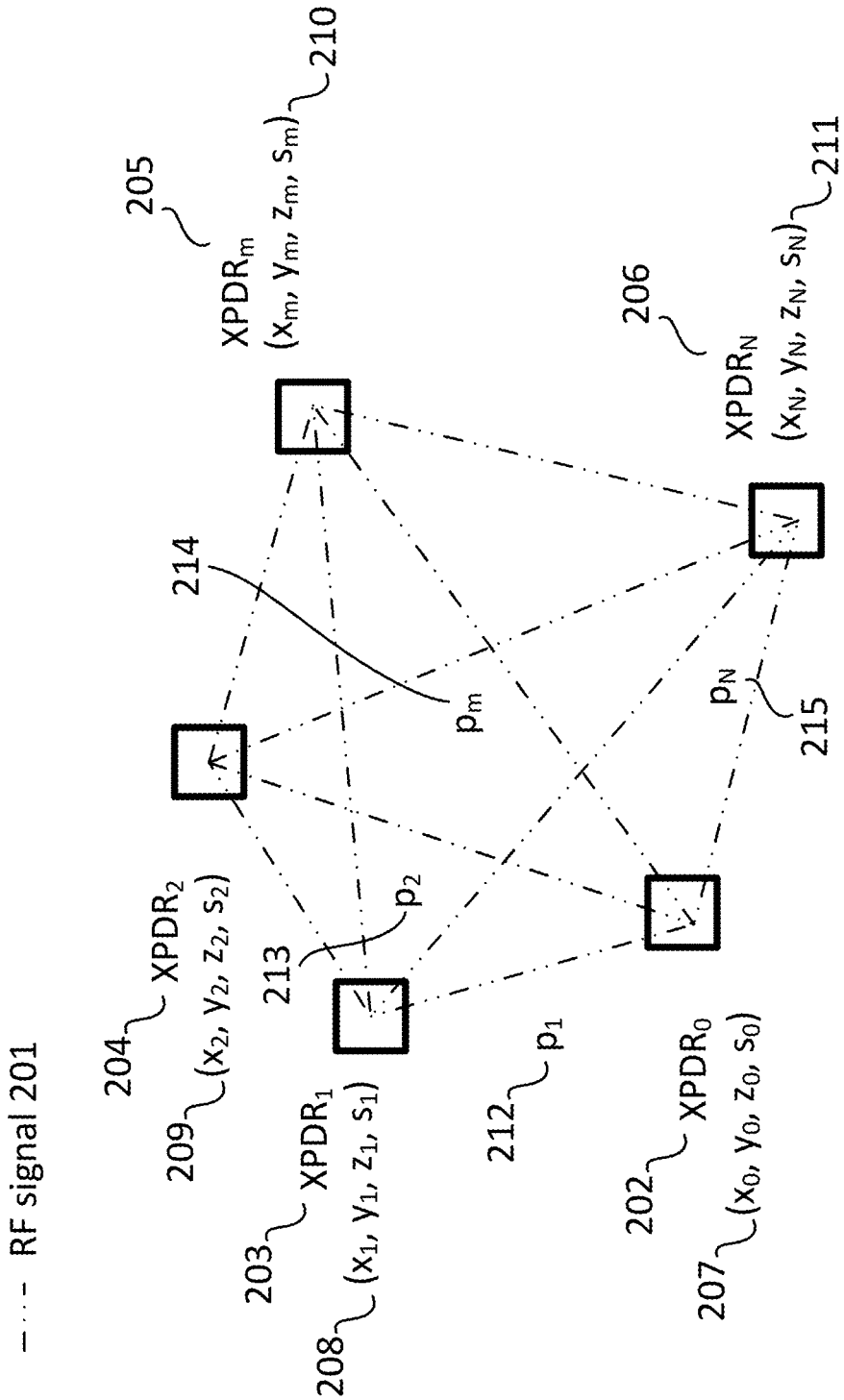
FIG. 2 illustrates time synchronization and establishment of a spatial coordinate system between multiple RF transponders using time of arrival (ToA) measurements.

The TX are located by their RF transmissions 101, which are detected by receiver hardware in the RDF transponders 103, as described in FIG. 2. The RF transponders may use any communication protocol 102, such as TCP/IP over Ethernet and various physical layers such as 802.11 Wi-Fi, Ethernet physical layer (e.g. 10BASE-T, 10BASE2, 10BASE5, 100BASE-TX, 100BASE-FX, 100BASE-T, 1000BASE-T, 1000BASE-SX and other varieties), or Bluetooth, to communicate with network bridges 106 and gateways 107. The network bridges 106 serve to connect multiple network segments, namely the transponder nodes or other hardware with network interface controllers (NICs), to the mesh network. The mesh network may be implemented using hard-wired connections such as Ethernet or fiber optic cables, or wireless uplinks and downlinks using 802.11 Wi-Fi, Bluetooth, or other standard.

Further, the RDF transponders may have built-in Wi-Fi or Bluetooth modules, enabling the RDF transponders to act as network routers which establish an ad-hoc local area network (LAN) without need for installing hard-wired connections or separate wireless access points (WAPs).

The network bridges 108 communicate with one or more gateways, which serve to interface the network with a local server 109 via a NIC 110 or a router 112 which provides access to a remote server 115 via a separate NIC 114 over a wide area network (WAN) or the Internet 113. Here, the Internet denotes the global system of interconnected computer networks that use the Internet protocol suite (TCP/IP), and is distinct from the World Wide Web (WWW), which only provides access to web pages and other web resources and is a subset of the network services provided by the Internet. Both the local server 11 and the remote server 115 may be used to store, process, and relay to other computers or devices the data acquired from the local positioning system (LPS) described in the present embodiments.

FIG. 2 shows a method for clock synchronization and spatial registration between a reference transponder (XPDR) 202 and a plurality of spatially separated transponders 203-206 using time of arrival (ToA) or time of arrival (ToA) measurements of radio-frequency (RF) transmissions 201 between the said transponders. A common time standard and coordinate system between the transponders are required correctly determine locations of transmitters based on time difference of arrival or frequency difference of arrival (TDoA/FDoA) data. This may be achieved by sending RF transmissions between the receivers, recording the time in which the signals from other receivers are measured by each receiver, and performing the following calculations, which are similar to those used for GPS/GNSS ranging. The x, y, and z coordinates of a receiver and transmission time are denoted as $(x_i, y_i, z_i, s_i)$ 207-211 where the subscript i denotes the receiver and has the value 1, 2, . . . , n. Unlike in GPS ranging, however, the coordinates of each receiver is known since the coordinate system is defined in relation to the transponder locations.

The true reception time $t_i$ is not directly measurable due to timing errors in the on-board clock in the transponder, so the apparent reception time $t_{i,a}$ is corrected by a clock bias factor $b_i$ in the receiver clock to provide self-consistent results. The distance traveled by a transmission from transmitter i is $(t_{i,a}-b_i-s_i)c$, where c is the speed of light at which the transmission travels. For n receivers, the self-consistency equations that must be satisfied are:

$$(x-x_i)^2+(y-y_i)^2+(z-z_i)^2=([t_{i,a}-b_i-s-i]c)^2, i=1,2,\ldots,n$$

or, equivalently, in terms of pseudoranges 212-215, $p_i=(t_{i,m}-s_i)$ c, as $$\sqrt{(x-x_i)^2+(y-y_i)^2+(z-z_i)^2}+b_ic=p_i$$

If the absolute spatial coordinates $x_i$, $y_i$, and $z_i$ and clock bias factors $b_i$ are required for each receiver, then a minimum of five separate measurements are required to uniquely solve the self-consistency relations (given that reported values of $s_i$ may be inaccurate due to processing delays and time jitter.) However, for a relative coordinate system, $x_i$, $y_i$, and $z_i$ are taken to be equal to defined values for each receiver and only the clock bias factors $b_i$ have to be determined, requiring only two receivers. When the number of receivers, n, is greater than the number of unknown quantities, the system of self-consistency equations is overdetermined and must be optimized with a fitting method, such as least-squares or the iterative Gauss-Newton method. Error bounds for the calculated position may be determined using statistical methods (e.g., Cramer-Rao bound for maximum likelihood estimation).

Figure 3:
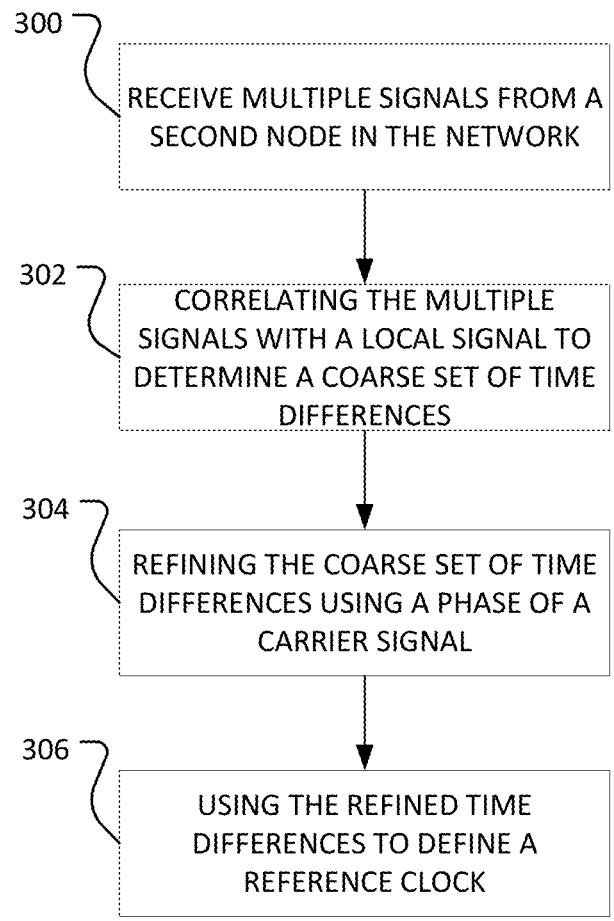
FIG. 3 shows an embodiment of a method to define a reference clock.

FIG. 3 shows an embodiment of a method for determining a reference clock. The process shown in FIG. 3 occurs at one of the nodes of a mesh network. At 300, the node receives multiple signals from a second node in the mesh network. The first node then correlates the multiple signals with a local signal generated by the first node to determine a coarse set of time differences at 302. The node then refines the coarse set of time differences using a phase of a carrier signal of the multiple signals to produce a refined set of time differences at 304. The process then uses the refined set of time differences to define a reference clock for use in the network at 306.

The signals received at the first node will typically be pseudorandom ranging codes from the second node. The first node generates its own pseudorandom ranging codes that it then uses to perform the correlation. The node demodulates the local signal to locate a local signal peak and then demodulating the multiple signals to locate multiple signal peaks. The node then correlates the local signal peaks and the multiple signal peaks to determine an offset for the second node. The node then using the offset for the second node to determine a coarse set of time differences.

In one embodiment, refining the coarse set of time differences involves determining a frequency and phase of the carrier signal. The node then uses the frequency and phase of the carrier signal to determine a fractional offset between carrier signal and the coarse set of time differences. This is then used to determine a fractional offset to adjust the coarse set of differences to a higher level or precision than the coarse set of differences.

The discussion above focuses on two nodes. It is possible that this embodiment can be employed in a network having multiple nodes. The node receives multiple signals from at least a third node in the mesh network and performing the correlating, the refining and the using for at least the third node. Each node in the network may perform this correlation between each other node.

Figure 4:
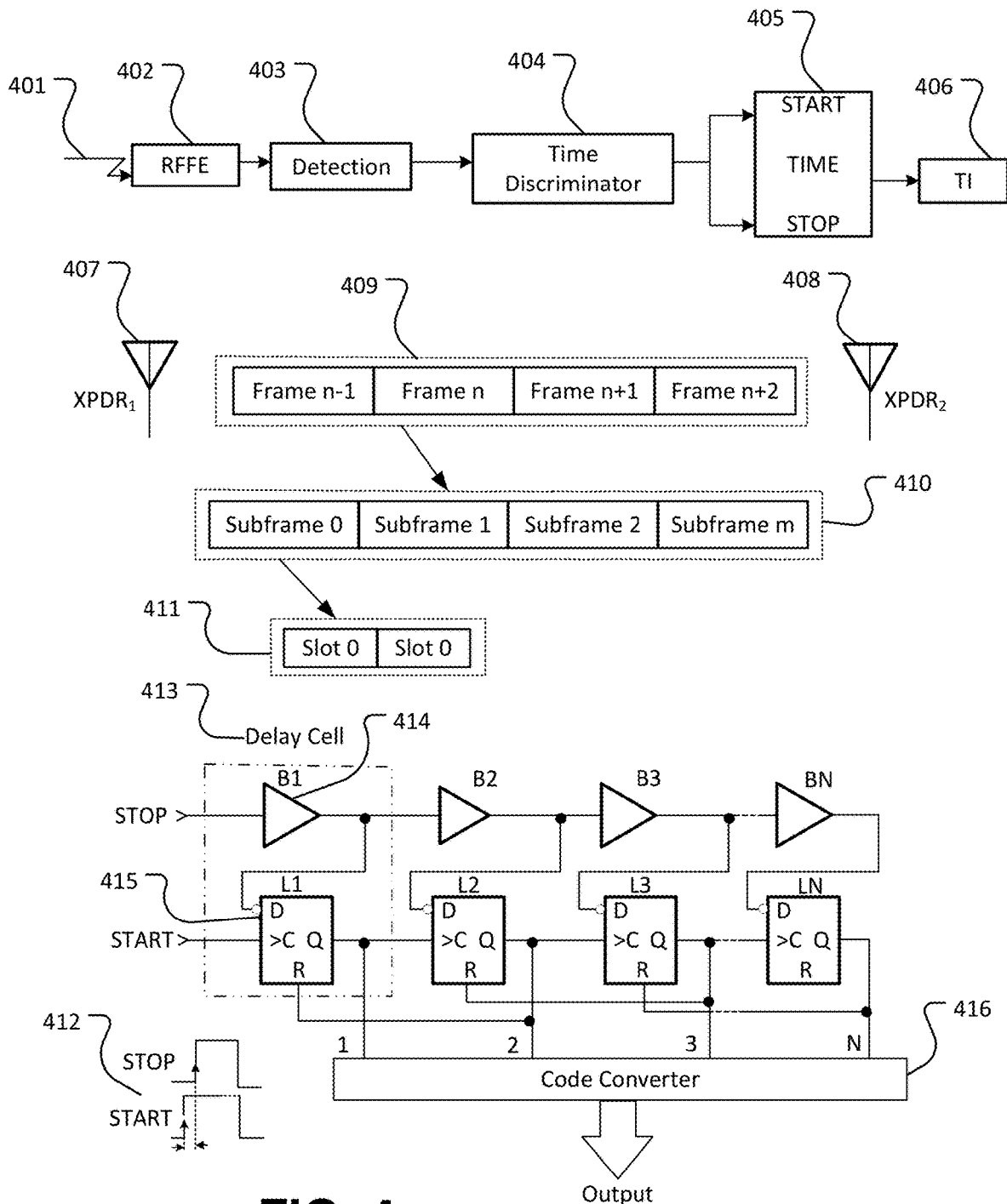
FIG. 4 illustrates an embodiment of a method for time synchronization between multiple RF transponders using time interval (TI) measurements with a time-to-digital converter (TDC).

FIG. 4 illustrates another technique for time synchronization between said transponder nodes in the mesh network, which is to be compared to FIG. 2, using time interval (TI) measurement. In preferred embodiments, this may be implemented with a time-to-digital converter (TDC), which converts the TI into a corresponding digital signal. A radio frequency (RF) front end (RFFE) 402 is used to downconvert the incoming RF signal 401 to baseband frequencies, which are chosen per application, communication standard, and corresponding RF spectrum bands. A time discriminator 404 outputs pulses corresponding to the start and end of the time synchronization communication, based on chosen recognition events for the signal. For example, in the case of packet communication, the start and end of the time interval 406 may correspond to a series of training symbols in the subframe of a packet header or trailer 409-411, which may be recognized with an appropriate detection algorithm 403, such as Schmidl-Cox detection. In some embodiments, the time interval itself may be measured using a non-interpolating time interval meter (TIM) 405. The TIM may be implemented with the dual interpolation method on a differential (Vernier) tapped delay line, consisting of two delay lines with N delay cells and the output decoder. The delay cells each consist of a D flip-flop latch L 415 having a delay $\tau_1$ between the input, D, and the output, Q, for the first delay line; the second delay line has a series of non-inverting buffers 414 with delay $\tau_2<\tau_1$. The input TI is determined by the time interval between the rising edges of the START and STOP pulses 412, with the value being coded by the position M of the last cell in which the rising edge (L→H) at the input C is ahead of that at input D. The TI is then represented as a 1 out of N code, or one-hot encoding. A binary representation 417 is then obtained with a code converter 416. In various embodiments, the TDC may be implemented on a complementary metal oxide semiconductor (CMOS) field programmable gate array (FPGA) technology, with the code converter being implemented with an array of multiple input OR gates. The TDC described here is an example of a flash TDC, in which no internal processing is required for a TI measurement. Additionally, sampling for digital-to-analog (DAC) conversion adds a negligible overhead in the conversion time, allowing time resolutions of >100 ps, or a positioning resolution of >3 cm, in various embodiments.

Figure 5:
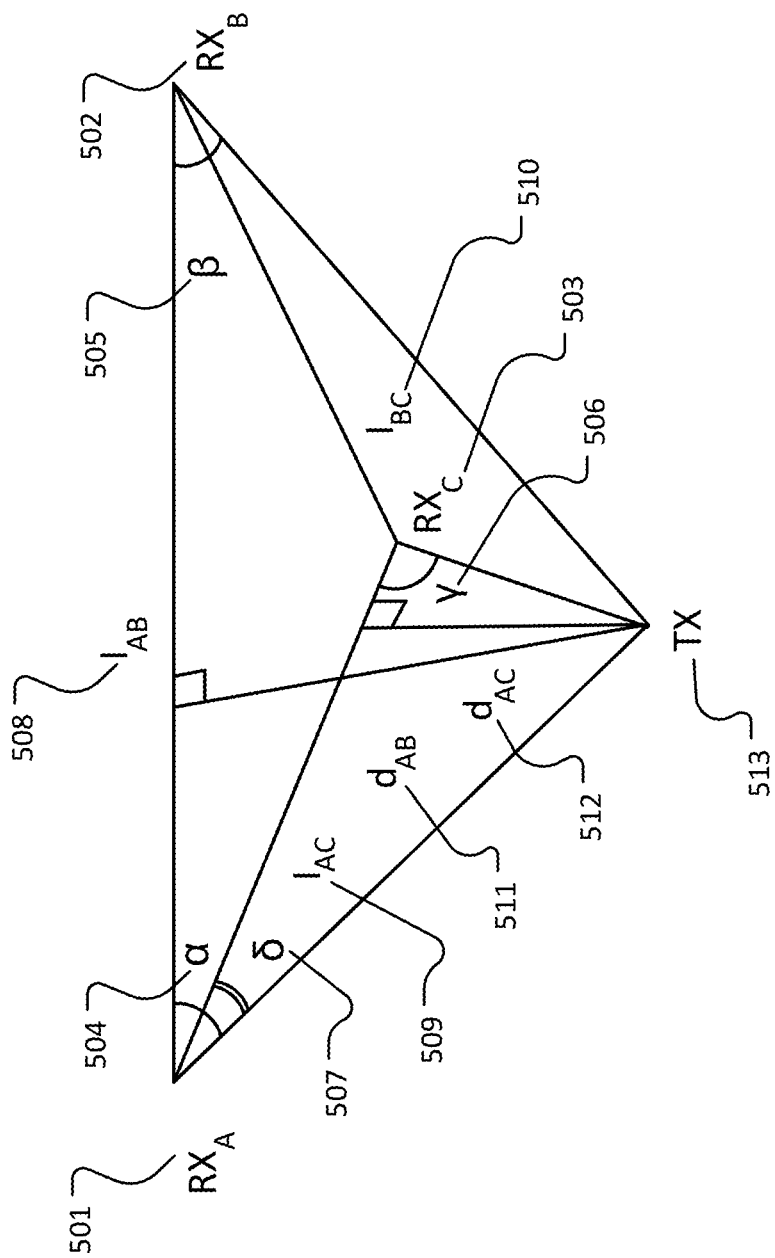
FIG. 5 illustrates embodiments of the geometry of multiangulation radio direction finding (RDF).

FIG. 5 illustrates the geometry of a multiangulation calculation for radio direction finding (RDF) of a radio-frequency (RF) transmitter using two or more receivers, according to various embodiments. This example calculation consists of two or more receivers depicted as but not limited to three receivers 501-503, angles 504-507 relative to the receivers for the incident signals from the transmitter 513, known distances 508-510 between the receivers which may be determined from time of arrival (ToA) measurements as illustrated in FIGS. 2-3, and calculated positions 511-512 relative to the vectors between the receivers 508-510. The two calculated positions $d_{AB}$ and $d_{AC}$ 511-512 (or combinations involving $d_{BC}$), relative to the vectors between the receivers 508-510, uniquely determine the location of the transmitter in three-dimensional space. This technique may be used with only two receivers, as in triangulation, or more than two receivers, as in multiangulation, in which the former may be used to determine two-dimensional coordinates of a transmitter and the latter is preferred in applications where the full three-dimensional (3D) coordinates of the transmitter are required. It can be shown that the calculated positions 511-512 are given by $$d_{AB} = l_{AB} \frac{\sin(\alpha)\sin(\beta)}{\sin(\alpha + \beta)}$$

$$d_{AC} = l_{AC} \frac{\sin(\delta)\sin(\gamma)}{\sin(\delta + \gamma)}$$

Figure 6:
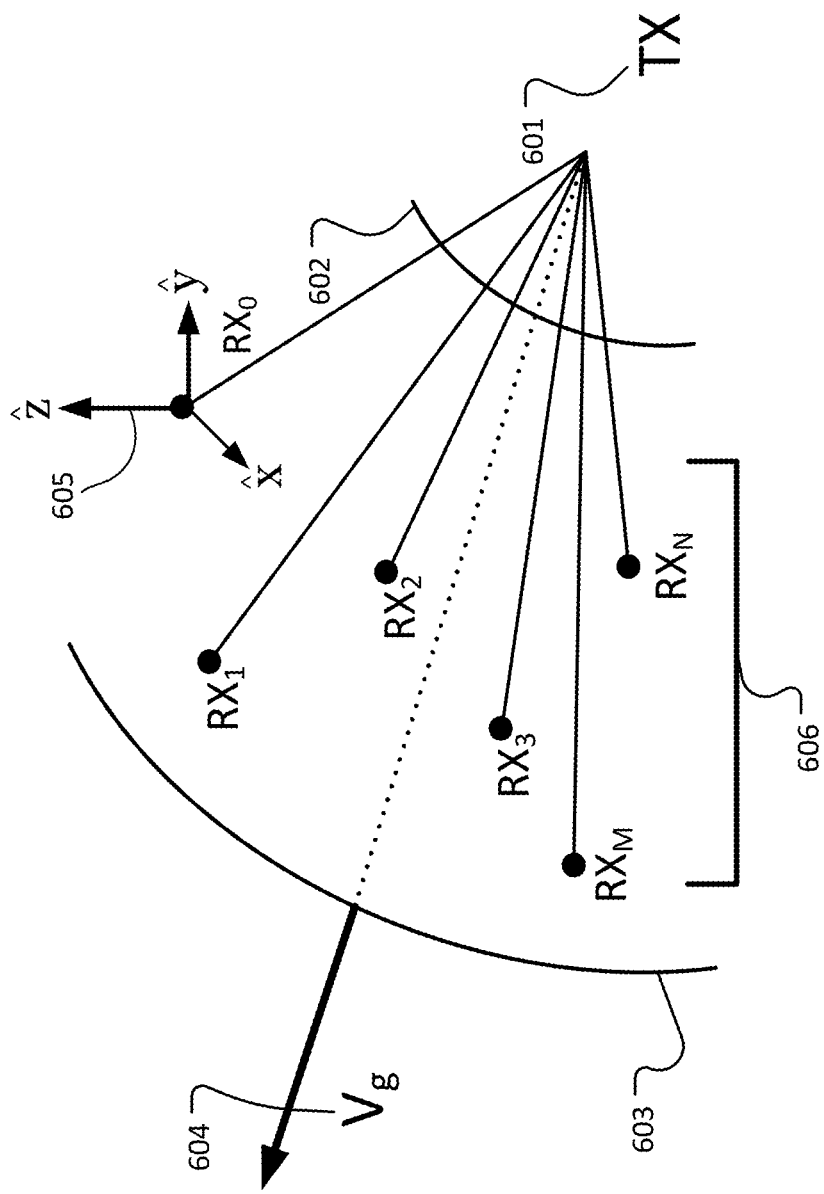
FIG. 6 illustrates embodiments of the geometry of multilateration (MLAT) radiolocation using time difference of arrival/frequency difference of arrival (TDoA/FDoA).

FIG. 6 illustrates the geometry for a multilateration (MLAT) calculation for radiolocation of a radio-frequency (RF) transmitter using four or more receivers 606 to uniquely determine the three-dimensional coordinates 605 of the transmitter 601, or fewer than four receivers to determine the approximate location of the transmitter, according to various embodiments. The RF signal will propagate outwards from the transmitter 602-603 and may be detected by the receivers at different times, depending on whether the receivers are located at different distances from the source of the signal. MLAT is based on the measured time difference of arrival or frequency difference of arrival (TDoA/FDoA) of a signal from a transmitter measured by receivers at known locations. The location of the transmitter may be calculated uniquely from TDoA/FDoA measurements from four or more spatially separated receivers, in which the coordinates of the transmitter are determined by the locus of the hyperboloid sets of possible emitter locations. Denoting the transmitter location vector as E=(x,y,z), and the known receiver locations as $P_0, P_1, \ldots, P_m, \ldots, P_N$, the distance $R_m$ between the transmitter and one of the receivers in terms of the coordinates is $$R_m = \sqrt{(x_m-x)^2+(y_m-y)^2+(z_m-z)^2}$$

$$R_0 = \sqrt{x^2+y^2+z^2}$$

where $R_0$, for simplicity, is taken to correspond to the receiver location $P_0$ being located at the origin. The TDoA equation for receivers 0 and m is $$c\tau_m = cT_m - cT_0 = R_m - R_0$$

where c is the speed of light at which the transmission travels 604. This system of equations may be solved by the iterative Gauss-Newton method or Gaussian elimination by forming the system of equations $$A_m = \frac{2x_m}{c\tau_m} - \frac{2x_1}{c\tau_1}$$

$$B_m = \frac{2y_m}{c\tau_m} - \frac{2y_1}{c\tau_1}$$

$$C_m = \frac{2z_m}{c\tau_m} - \frac{2z_1}{c\tau_1}$$

$$D_m = c\tau_m - c\tau_1 - \frac{x_m^2+y_m^2+z_m^2}{c\tau_m} + \frac{x_1^2+y_1^2+z_1^2}{c\tau_1}$$

for the receivers $2 \leq m \leq N$ and the TDoA equation for receiver 0

$$c\tau_1 + 2r_0 + \frac{r_0^2 - r_m^2}{c\tau_m} = 0$$

Figure 7:
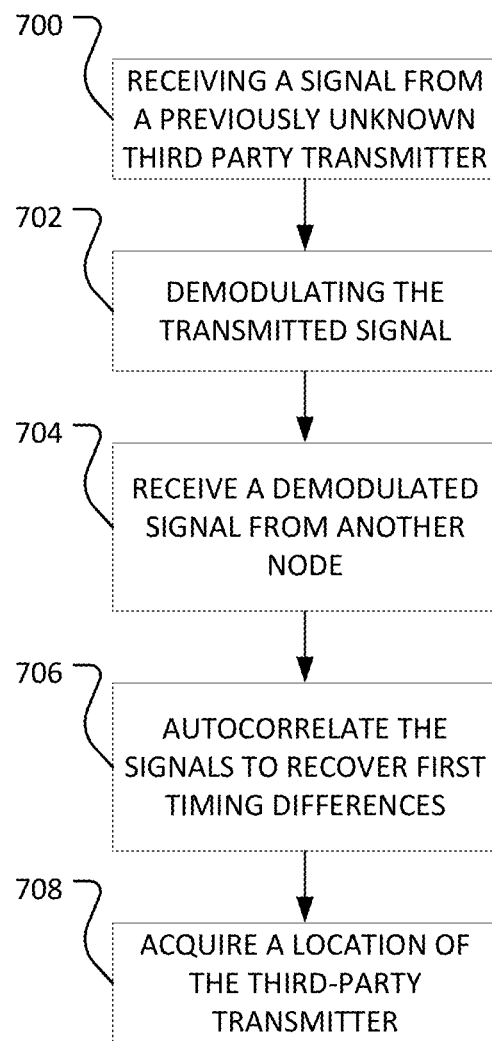
FIG. 7 shows an embodiment of a method of detecting and tracking a previously-unknown, third-party transmitter.

FIG. 7 shows an embodiment of a method of locating a third-party, previously-unknown transmitter using transponders in a mesh network at 700. The node receives a transmitted signal from a previously-unknown, third-party transmitter. The node then demodulates the transmitted signal at the first node to produce a demodulated local signal at 702. The first node then receives from at least one other node in the network another demodulated signal, referred to here as a demodulated remote signal at 704. At 706, the node autocorrelates the demodulated local signal and the demodulated remote signal to recover first timing differences between the demodulated remote signal and the demodulated local signal. The node then uses the first timing difference to acquire a location of the third-party transmitter at 708.

Other processes may occur as part of the overall process of FIG. 7. The node may store the demodulated signal, for example. In addition, the nodes may pass the demodulated local signals to other nodes. The third-party transmitters will more than likely not transmit pseudorandom ranging codes, but may instead transmit random data streams with low correlations between data sampled from a data stream at different times. Further, similar to the refinement in the communications between nodes, the carrier signal may be used to refine the first timing differences by using the frequency and phase of the carrier signal to determine a fractional offset between the carrier signal and the first timing differences, and then using the fractional offset to adjust the first timing differences to a higher level or precision than the coarse set of differences. As also discussed previously, this process may occur between multiple nodes.

Figure 8:
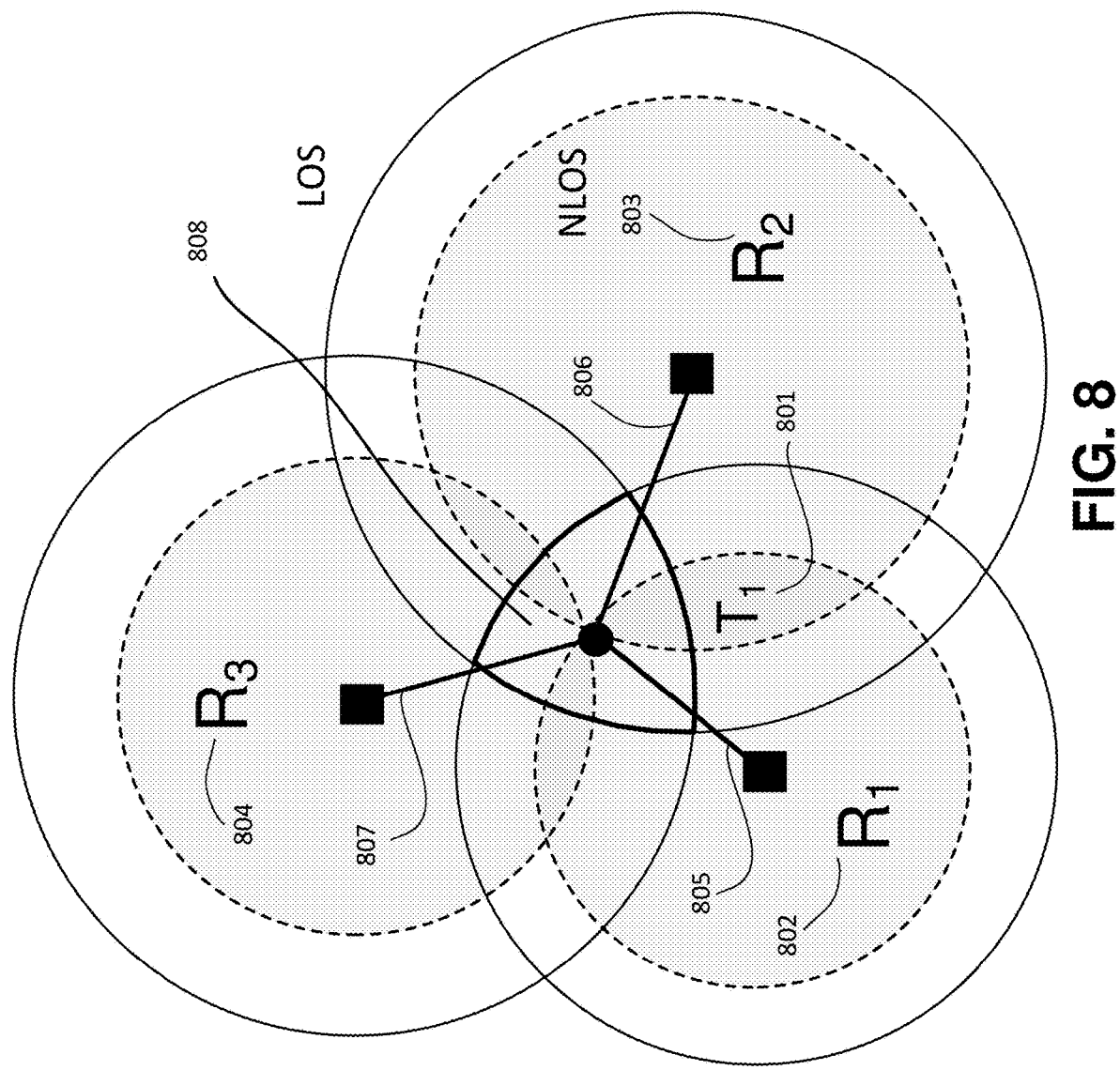
FIG. 8 depicts embodiments of a calculation of the three-dimensional bounding volume for the location of the transmitter in the case of multipath propagation.

FIG. 8 depicts the calculation of the three-dimensional bounding volume for the location of the transmitter in the case of multipath propagation when direct line-of-sight (LoS) transmission is not available due to obstructions in the operating environment, which may reflect or impede the radio-frequency (RF) transmission, according to various embodiments. This technique is useful for determining the approximate location of a transmitter when multilateration (MLAT) or multiangulation fail, which require discrimination of the direct LoS transmission. The figure depicts the transmitter 801, the three receivers 802-804, the calculated angle of arrival (AoA) headings from multiangulation 805-807, and the bounding volume 808.

The AoA headings 805-807 may be inaccurate due to reflections of the RF transmission in the environment, but may be compared with the present calculations to check for consistency and improve the accuracy of the method. For direct LoS propagation with no obstructions, the signal will propagate equally well in all directions in space and will therefore trace out a spherical wavefront with radius $(t_{i,m}-b_i-s_i)c$, where c is the speed of light at which the transmission travels, $t_{i,m}$ is the apparent reception time of the signal by a receiver i, and $b_i$ is the clock bias factor of the receiver. In the case of multipath propagation, the transmitter location will be within, but not outside, the spherical region for each receiver. The bounding volume 823 of the transmitter is therefore given by the locus of the intersecting volume between the spherical regions for each transmitter. The technique is provided here as an example implementation of a fuzzy locating system and may be complemented with other techniques, such as statistical or adaptive methods.

Figure 9:
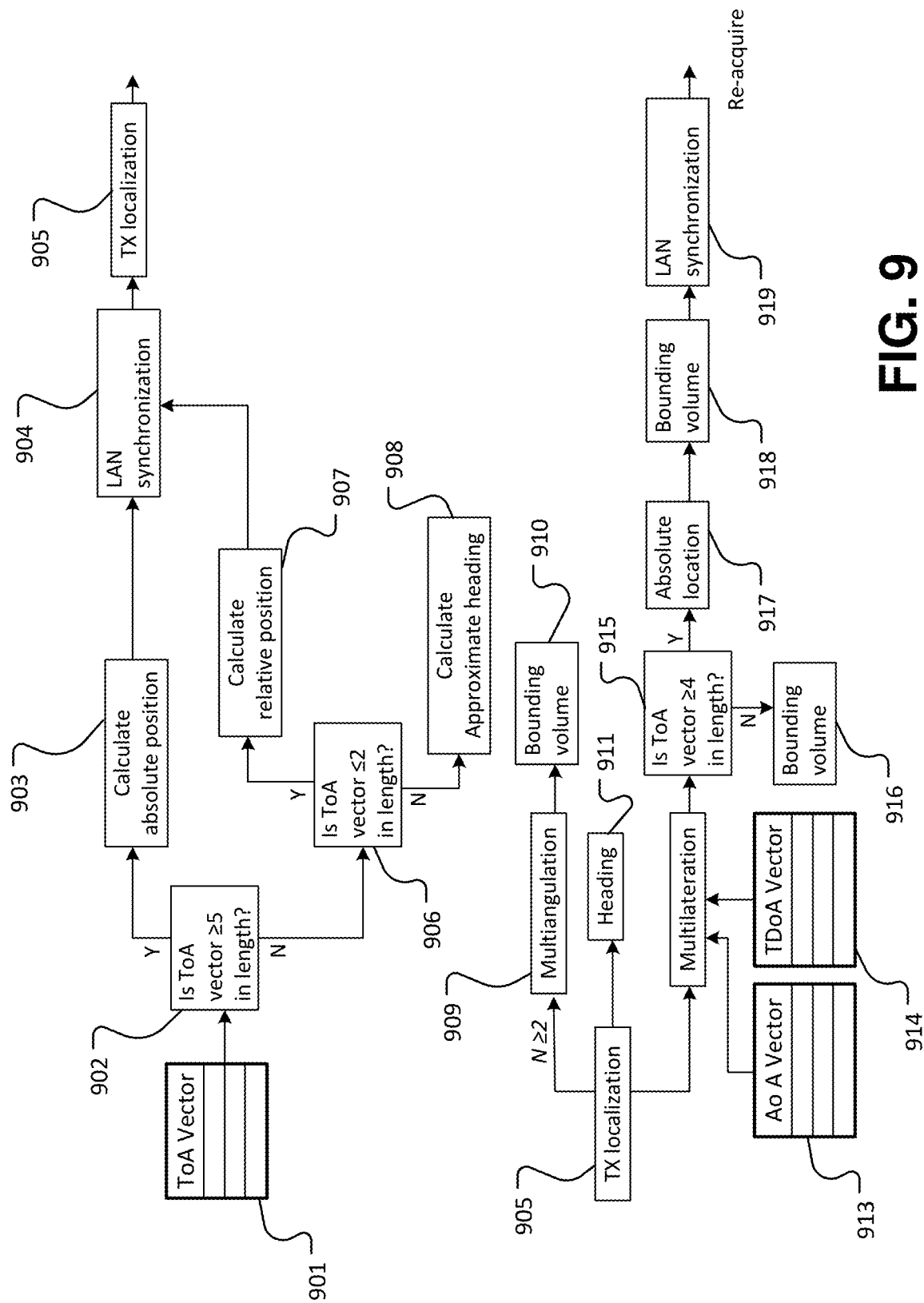
FIG. 9 shows embodiments of system configurations for determining the spatial locations of transmitters for different numbers of receivers, according to various embodiments.

FIG. 9 is a flow diagram showing various system configurations for determining the spatial locations of transmitters (TX) for different numbers of transponders in the mesh network, according to various embodiments. It may be advantageous in various implementations to have fewer transponders in the mesh network due to cost or space considerations. The method described in the present embodiments may be implemented with as few as one transponder, but provides additional radio location accuracy with more transponders in the network. The process for locating an RF transmitter may be divided into two main stages: establishing a common spatial coordinate and time base for the transponder in the mesh network, and applying radiolocation techniques to locate the transmitter based on data acquired from each transponder. For a network of N transponders, a vector of time of arrival (ToA) data 901 is acquired for each transponder relative to all others in the network. This is accomplished by sending an RF transmission originating from each other transponder in the network to each receiver in turn.

If the number of TDoA measurements between transponders $N_m \geq 5$ for a given synchronization, 902, which is possible when $N \geq 4$, the receiver may calculate its absolute position 903 based on the ToA data from the other transponders in the network, following the procedure described in FIG. 2. Failing this condition, if $N \geq 2$, the relative position of the receiver may be calculated using the procedure described in FIG. 2. If $N=1$, then the heading of the transponder may be determined based on angle of arrival (AoA) data from other RF transmissions, or other methods such as an electronic compass utilizing a magnetometer or fiber optic gyrocompass, or defined to a set value, and is not limited to these methods. The receiver exchanges data with other transponders in the network 904 to establish a common spatial coordinate and time base.

The second stage of the process described in the embodiments is transmitter localization 905, which is achieved using various radiolocation techniques. If $N \geq 2$, multiangulation of the transmitter 909 is attempted using a vector of angle of arrival (AoA) data 913, using the procedure described in FIG. 3, which may be used to determine the absolute position of the transmitter. If $N \geq 4$, multilateration (MLAT) may also be used to determine the absolute position of the transmitter. In all cases, a three-dimensional (3D) bounding volume for the possible locations of the transmitter may be constructed 910, 916, 918, as described in FIG. 5, or a fuzzy location estimate using, for example, statistical or adaptive methods.

The bounding volume calculation provides an approximate location of the transmitter and is more robust against effects from electromagnetic (EM) interference, multipath propagation, receiver noise, and network failures, all of which complicate the application of various radiolocation procedures. Once the position, or a set of possible positions, for the transmitter is determined, the data is sent over the mesh network 919 to additional gateways, bridges, or routers, which allow communication with other networks or remote servers via the Internet. The entire procedure in FIG. 6 or 7 is repeated frequently as desired to acquire positional data on the transmitter as a function of time over different measurement intervals.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:
1. A method comprising:
generating a local signal;
detecting a local signal peak of the local signal in a time domain;
receiving a set of remote signals;
detecting a set of remote signal peaks of the set of remote signals in the time domain;
calculating a set of time differences based on a correlation between the local signal peak and the set of remote signal peaks; and
defining a reference clock of a network based on the set of time differences.

2. The method of claim 1:
wherein each of the set of remote signals comprises a carrier signal characterized by a frequency and a phase; and
wherein defining the reference clock comprises:
refining the set of time differences based on a frequency and a phase of a carrier signal of each remote signal in the set of remote signals to generate a refined set of time differences; and
defining the reference clock based on the refined set of time differences.

3. The method of claim 2, wherein refining the set of time differences comprises, for each signal in the set of remote signals:
detecting a frequency and a phase of the carrier signal of the remote signal;
calculating a fractional offset of a corresponding time difference, in the set of time differences, based on the frequency and the phase of the carrier signal of the remote signal; and
refining the corresponding time difference, in the set of time differences, based on the fractional offset.

4. The method of claim 1, wherein receiving the set of remote signals comprises receiving the set of remote signals comprising pseudorandom ranging codes.

5. The method of claim 1, further comprising:
receiving a second set of remote signals;
detecting a second set of remote signal peaks of the second set of remote signals in the time domain;
correlating the local signal peak and the second set of remote signal peaks to calculate a second set of time differences; and
updating the reference clock based on the set of time differences and the second set of time differences.

6. The method of claim 1, further comprising:
at a first node in the network, receiving a first transmitted signal from a transmitter;
at the first node in the network, receiving a second transmitted signal derived from the first transmitted signal received at a third node;
correlating the first transmitted signal and the second transmitted signal to recover a first timing difference between the first transmitted signal and the second transmitted signal based on the reference clock of the network; and
estimating a location of the transmitter based on the first timing difference.

7. A method comprising:
receiving a first transmitted signal from a transmitter;
demodulating the first transmitted signal to generate a first demodulated transmitted signal;
from a node in a network, receiving a second demodulated transmitted signal derived from the first transmitted signal;
correlating the first demodulated transmitted signal and the second demodulated transmitted signal to recover a first timing difference between the first demodulated transmitted signal and the second demodulated transmitted signal based on a reference clock of the network; and estimating a location of the transmitter based on the first timing difference.

8. The method of claim 7, further comprising:
generating a local signal;
demodulating the local signal to detect a local signal peak;
receiving a set of remote signals from the node;
demodulating the set of remote signals to detect a set of remote signal peaks;
calculating a set of time differences based on a correlation between the local signal peak and the set of remote signal peaks; and
updating the reference clock of the network based on the set of time differences.

9. The method of claim 7, further comprising, at the node:
demodulating the first transmitted signal to generate the second demodulated transmitted signal.

10. The method of claim 7, further comprising refining the first timing difference based on a carrier signal of the first transmitted signal.

11. The method of claim 7:
further comprising:
receiving, from a second node in the network, a third demodulated transmitted signal derived from the first transmitted signal received at the second node;
receiving, from a third node in the network, a fourth demodulated transmitted signal derived from the first transmitted signal received at the third node;
correlating the first demodulated transmitted signal and the third demodulated transmitted signal to recover a second timing difference between the first demodulated transmitted signal and the third demodulated transmitted signal based on the reference clock of the network; and
correlating the first demodulated transmitted signal and the fourth demodulated transmitted signal to recover a third timing difference between the first demodulated transmitted signal and the fourth demodulated transmitted signal based on the reference clock of the network; and
wherein estimating the location of the transmitter comprises estimating the location of the transmitter in three dimensions based on the first timing difference, the second timing difference, and the third timing difference.

12. A method comprising:
at a first node in a network:
generating a first local signal;
detecting a first local signal peak in a pair of local signal peaks;
receiving a first remote signal from a second node in the network; and
detecting a first remote signal peak in a pair of remote signal peaks;
at the second node in the network:
generating a second local signal;
detecting a second local signal peak in the pair of local signal peaks;
receiving a second remote signal from the first node in the network; and
detecting a second remote signal peak the pair of remote signal peaks;
based on the pair of local signal peaks and the pair of remote signal peaks:

calculating a time offset between a first clock of the first node and a second clock of the second node; and
calculating a distance between the first node and the second node.

13. The method of claim 12, further comprising:
receiving, at the first node, a first transmitted signal from a transmitter;
receiving, from the second node, a second transmitted signal derived from the first transmitted signal received at the second node;
correlating the first transmitted signal and the second transmitted signal to recover a first timing difference between the first transmitted signal and the second transmitted signal based on the time offset between the first node and the second node; and
estimating a location of the transmitter based on the first timing difference and the distance between the first node and the second node.

14. The method of claim 13, wherein receiving the first transmitted signal from the transmitter comprises at the first node, receiving the first transmitted signal from the transmitter, the first transmitted signal comprising wireless data stream.

15. The method of claim 13, wherein estimating the location of the transmitter based on the first timing difference and the distance between the first node and the second node comprises calculating a three-dimensional bounding volume for the transmitter based on the first timing difference and the distance between the first node and the second node.

16. The method of claim 13 further comprising:
at the first node and at the second node, detecting a carrier phase offset of the first transmitted signal to generate a pair of carrier phase offsets; and
refining the location of the transmitter based on the pair of carrier phase offsets.

17. The method of claim 13, further comprising:
associating the transmitter with an identifier based on the first transmitted signal;
associating subsequently-received transmitted signals from the transmitter with the identifier;
recording location data and movement data of the transmitter based on the subsequently-received transmitted signals and the identifier; and
generating a visual representation of a location of the transmitter based on the location data and the movement data.

18. The method of claim 13, wherein receiving the first transmitted signal from the transmitter comprises at the first node, receiving the first transmitted signal from a third node in the network.

19. The method of claim 12:
wherein receiving the first remote signal from the second node in the network comprises receiving the first remote signal from a second cellular site in a cellular network; and
wherein receiving the second remote signal from the first node in the network comprises receiving a first cellular site signal from the first node in the cellular network.

20. The method of claim 12:
wherein receiving the first remote signal from the second node in the network comprises receiving the first remote signal from a second low-Earth satellite in a geolocation system; and wherein receiving the second remote signal from the first node in the network comprises receiving a first cellular site signal from the first low-Earth satellite in the geolocation system.

\* \* \* \* \*